United States Patent
Wong et al.

(10) Patent No.: US 9,265,021 B2
(45) Date of Patent: Feb. 16, 2016

(54) MINIMAL ACCESS TRANSFER CONTROL FUNCTION REQUIREMENTS FOR SINGLE RADIO VOICE CALL CONTINUITY HANDOVER

(71) Applicant: NOKIA SIEMENS NETWORKS OY, Espoo (FI)

(72) Inventors: Curt Wong, Sammamish, WA (US); Lauri Kalevi Lahtinen, Espoo (FI); Alexander Milinski, München (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 119 days.

(21) Appl. No.: 13/633,239

(22) Filed: Oct. 2, 2012

(65) Prior Publication Data

US 2013/0084860 A1     Apr. 4, 2013

Related U.S. Application Data

(60) Provisional application No. 61/543,070, filed on Oct. 4, 2011.

(51) Int. Cl.
*H04W 60/00* (2009.01)
*H04W 36/00* (2009.01)

(52) U.S. Cl.
CPC .......... *H04W 60/00* (2013.01); *H04W 36/0022* (2013.01)

(58) Field of Classification Search
CPC ... H04W 36/00; H04W 36/0022; H04W 8/20; H04W 165/1016; H04W 69/24; H04W 67/306; H04W 65/1073; H04W 60/00
USPC .......... 370/328, 331, 352; 379/38; 455/435.1, 455/436
See application file for complete search history.

(56) References Cited

U.S. PATENT DOCUMENTS

| 7,957,376 | B2 | 6/2011 | Eriksson et al. |
|---|---|---|---|
| 2009/0270097 | A1 | 10/2009 | Gallagher et al. |
| 2009/0290542 | A1 | 11/2009 | Luo et al. |
| 2010/0246780 | A1 | 9/2010 | Bakker et al. |
| 2011/0096746 | A1 | 4/2011 | Belling et al. |
| 2011/0164564 | A1 | 7/2011 | Vedrine et al. |
| 2013/0128865 | A1* | 5/2013 | Wu et al. ........................ 370/331 |
| 2013/0294407 | A1* | 11/2013 | Mutikainen et al. .......... 370/331 |

OTHER PUBLICATIONS

3GPP TR 23.886 v10.0.0 (Sep. 2010) Technical Specification Group Service and System Aspects; Feasibility Study of Single Radio Video Call Continuity (vSRVCC); Stage 2 (Release 10).*
International Search Report for Application No. PCT/US2012/058397, dated Jan. 18, 2013.
English translation of Japanese Office Action dated Mar. 9, 2015, for corresponding Japanese Patent Application No. 2014-534631.

(Continued)

*Primary Examiner* — Nizar Sivji
(74) *Attorney, Agent, or Firm* — Squire Patton Boggs (US) LLP

(57) ABSTRACT

A method, apparatus, and computer readable medium is provided for a reverse single radio voice call continuity handover procedure, where an access transfer control function is only allocated dynamically during a call setup phase, if the access transfer control function is needed to support the reverse single radio voice call continuity handover procedure.

18 Claims, 14 Drawing Sheets

(56) References Cited

OTHER PUBLICATIONS

TD S2-103926; ZTE; "Update to alternative 5 of rSRVCC"; 3GPP TSG SA WG2 Meeting #80; Aug. 30-Sep. 3, 2010, Brunstad, pp. 1-5.
C1-111617; Ericsson; "EN on ATCF URI assignment"; 3GPP TSG CT WG1 Meeting #71; Tallinn (Estonia), May 9-13, 2011, pp. 1-11.
S2-114137; Nokia Siemens Networks,Nokia; "PS Media IP/port and IMS aspect for rSRVCC"; 3GPP TSG-SA2 Meeting #87; Oct. 10-14, 2011, Jeju Island, South Korea, pp. 1-10.
European Patent Office, Extended Search Report for corresponding Appln. No. 12838809.7, Oct. 5, 2015.
3GPP TR 23.885 V11.0.0 (Sep. 2011), Technical Report 3rd Generation Partnership Project, Technical Specification Group Services and System Aspects, Feasibility Study of Single Radio Voice Call Continuity (SRVCC) from UTRAN/GERAN to E-UTRAN/HSPA, Stage 2 (Release 11), Sep. 27, 2011, XP050553882, p. 26, paragraph 6.3.1-p. 27, paragraph 6.3.2.1, pp. 43-45, paragraph 6.3.3.7.5.
3GPP: 3GPP TS 23.237 V11.2.0 (Sep. 2011); 3rd Generation Partnership Project; Technical Specification Group Services and System Aspects; IP Multimedia Subsystem (IMS) Service Continuity; Stage 2 (Release 11), pp. 29-31, paragraph 6.1.2.
3GPP TS 23.292 V11.0.0 (Jun. 2011), 3GPP, Technical Specification Group Services and System Aspects, IP Multimedia Subsystem (IMS) centralized services, Stage 2, (Release 11), XP050552988, p. 26, paragraph 7.3.2-p. 28, paragraph 7.3.2.2.4.
Nokia Siemens Networks et al: S2-114136 (revision of S2-11xxxx), PS Media IP/port and IMS aspect for rSRVCC, SA WG2 Meeting #87; Oct. 10-14, 2011, 3GPP Draft; XP050549319, Oct. 4,2011, p. 1.
3GPP: 3GPPTS 23.237 V11.5.0 (Jun. 2012), 3GPP, Technical Specification Group Services and System Aspects, IP Multimedia Subsystem (IMS) Service Continuity, Stage 2, (Release 11) 3GPP Standard, XP050580713, p. 23, paragraph 5.3.1, p. 31, paragraph 6.1.2-p. 33, paragraph 6.1.3.2; pp. 35-36, paragraph 6.2.1.5, pp. 39-40, paragraph 6.2.2.3.

* cited by examiner

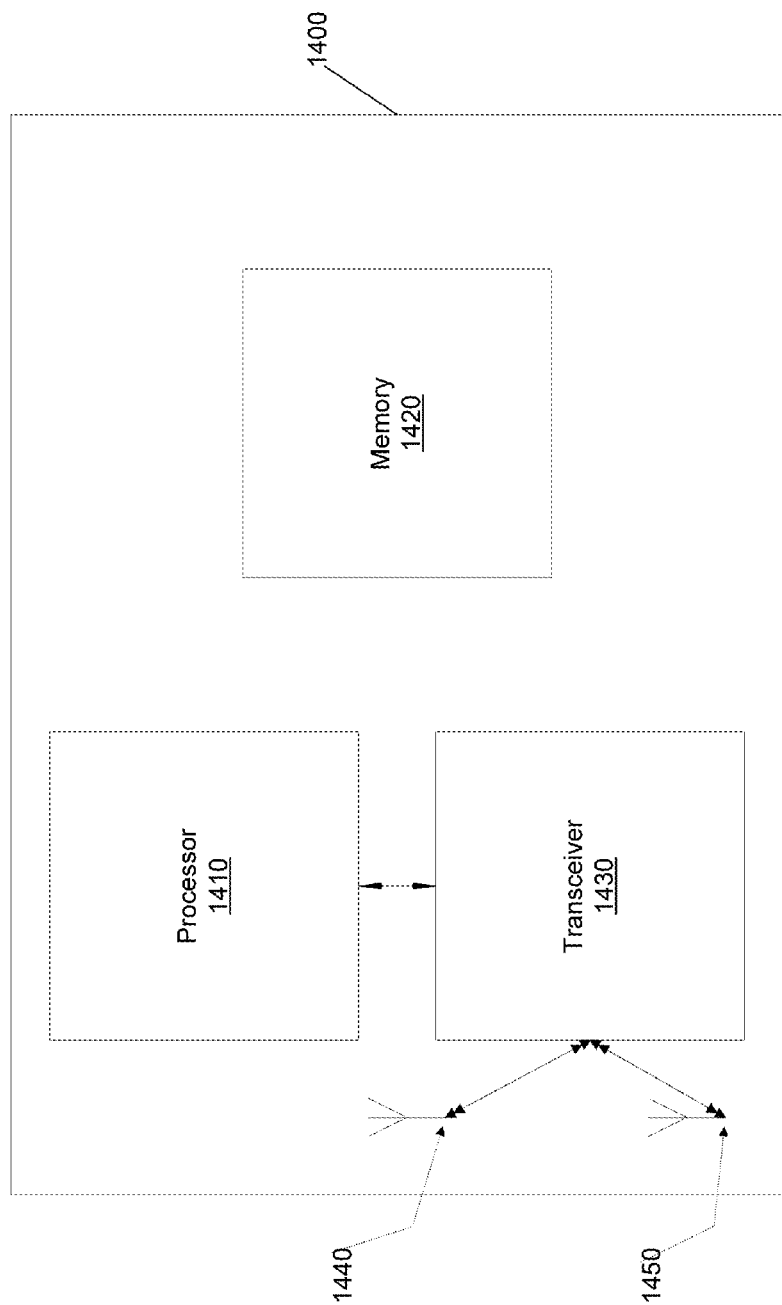

MINIMAL ACCESS TRANSFER CONTROL FUNCTION REQUIREMENTS FOR SINGLE RADIO VOICE CALL CONTINUITY HANDOVER

CROSS-REFERENCE TO RELATED APPLICATIONS

This application claims priority under 35 U.S.C. §119(e) of U.S. Provisional Patent Application Ser. No. 61/543,070, filed on Oct. 4, 2011. The subject matter of the earlier filed application is hereby incorporated by reference.

BACKGROUND

1. Field

Some embodiments of the invention relate generally to communication systems and particularly to internet protocol multimedia subsystem (IMS) communication systems. Certain embodiments also generally relate to supporting single radio voice call continuity and reverse single radio voice call continuity.

2. Description of the Related Art

A voice call initiated by a user equipment (UE) that is anchored in IMS can be persisted as the UE moves between circuit switched (CS) radio domains and packet switched (PS) radio domains, and vice-versa. For example, a voice call initiated by a UE within a third generation partnership project (3GPP) second-generation (2G) or third-generation (3G) telecommunication system can be handed over to a 3GPP long term evolution (LTE)-advanced communication system, and vice-versa.

As a more specific example, a voice call that is anchored in IMS can be initiated by a UE within a 3GPP universal terrestrial radio access network (UTRAN)/global system for mobile communications (GSM) enhanced data rates for GSM (EDGE) radio access network (GERAN) CS telecommunication system and handed over to an IMS over evolved universal terrestrial radio access network (e-UTRAN)/high speed packet access (HSPA) telecommunication system, and vice-versa. Voice call continuity from an IMS over EUTRAN/HSPA telecommunication system to a UTRAN/GERAN telecommunication system for voice calls that are anchored in IMS when the UE is capable of transmitting/receiving only one of those telecommunication systems at a given time is referred to as single radio voice call continuity (SRVCC). Voice call continuity from a UTRAN/GERAN telecommunication system to an IMS over E-UTRAN/HSPA telecommunication system for voice calls that are anchored in IM when the UE is capable of transmitting/receiving on only one of those telecommunication systems at a given time is referred to as reverse single radio voice call continuity (rSRVCC).

SUMMARY

According to an embodiment of the invention, a method includes receiving a registration request message from a user equipment, where the registration request message may be devoid of reverse single radio voice call continuity information. The method further includes including an access transfer control function uniform resource identifier in the registration request message when an access transfer control function supports reverse single radio voice call continuity. The method further includes transmitting the registration request message to a service centralization and continuity application server.

According to another embodiment, an apparatus includes a processor and a memory including computer program code. The memory and the computer program code are configured to, with the processor, cause the apparatus at least to receive a registration request message from a user equipment, wherein the registration request message may be devoid of reverse single radio voice call continuity information. The memory and the computer program code are further configured to, with the processor, cause the apparatus to include an access transfer control function uniform resource identifier in the registration request message when an access transfer control function supports reverse single radio voice call continuity. The memory and the computer program code are configured to, with the processor, cause the apparatus at least to transmit the registration request message to a service centralization and continuity application server.

According to another embodiment, an apparatus includes receiving means for receiving a registration request message from a user equipment, where the registration request message may be devoid of reverse single radio voice call continuity information. The apparatus further includes means for including an access transfer control function uniform resource identifier in the registration request message when an access transfer control function supports reverse single radio voice call continuity. The apparatus further includes transmitting means for transmitting the registration request message to a service centralization and continuity application server.

According to another embodiment, a non-transitory computer-readable medium includes a computer program stored therein that, when executed by a processor, causes the processor to implement a method. The method includes receiving a registration request message from a user equipment, wherein the registration request message may be devoid of reverse single radio voice call continuity information. The method further includes an access transfer control function uniform resource identifier in the registration request message when an access transfer control function supports reverse single radio voice call continuity. The method further includes transmitting the registration request message to a service centralization and continuity application server.

According to an embodiment of the invention, a method includes receiving a circuit-switched attach message from a user equipment. The method further includes transmitting a registration message to a service centralization and continuity application server, where the transmission of the registration message may bypass an access transfer control function. The method further includes receiving a registration response message from the service centralization and continuity application server. The registration response message includes an access transfer control function uniform resource identifier when the service centralization and continuity application server previously received the access transfer control function uniform resource identifier.

According to another embodiment, an apparatus includes a processor; and a memory including computer program code. The memory and the computer program code are configured to, with the processor, cause the apparatus at least to, receive a circuit-switched attach message from a user equipment. The memory and the computer program code are further configured to, with the processor, cause the apparatus at least to transmit a registration message to a service centralization and continuity application server, where the transmission of the registration message may bypass an access transfer control function. The memory and the computer program code are further configured to, with the processor, cause the apparatus at least to receive a registration response message from the service centralization and continuity application server. The registration response message includes an access transfer control function uniform resource identifier when the service centralization and continuity application server previously received the access transfer control function uniform resource identifier.

According to another embodiment, an apparatus includes receiving means for receiving a circuit-switched attach message from a user equipment. The apparatus further includes transmitting means for transmitting a registration message to a service centralization and continuity application server, where the transmission of the registration message may bypass an access transfer control function. The apparatus further includes receiving means for receiving a registration response message from the service centralization and continuity application server. The registration response message includes an access transfer control function uniform resource identifier when the service centralization and continuity application server previously received the access transfer control function uniform resource identifier.

According to another embodiment, a non-transitory computer-readable medium includes a computer program stored therein that, when executed by a processor, causes the processor to implement a method. The method includes receiving a circuit-switched attach message from a user equipment. The method further includes transmitting a registration message to a service centralization and continuity application server, where the transmission of the registration message may bypass an access transfer control function. The method further includes receiving a registration response message from the service centralization and continuity application server. The registration response message includes an access transfer control function uniform resource identifier when the service centralization and continuity application server previously received the access transfer control function uniform resource identifier.

According to an embodiment of the invention, a method includes receiving a mobile call originating setup message from a user equipment, where the mobile call originating setup message includes a port number and codec for the user equipment. The method further includes selecting an access control transfer function, where the selection of the access control transfer function is based either on a previously provided access control transfer function uniform resource identifier, or a local configuration when no access control transfer function uniform resource identifier was previously provided. The method further includes transmitting a first invite message to the selected access control transfer function. The method further includes receiving a second invite message from the selected access control transfer function, where the second invite message includes a session transfer identifier for reverse single radio voice call continuity populated by the selected access control transfer function. The method further includes transmitting a third invite message to a service centralization and continuity application server. The method further includes transmitting a call confirm/alert message to the user equipment, where the call confirm/alert message includes the session transfer identifier for reverse single radio voice call continuity.

According to another embodiment, an apparatus includes a processor and a memory including computer program code. The memory and the computer program code are configured to, with the processor, cause the apparatus at least to receive a mobile call originating setup message from a user equipment, where the mobile call originating setup message includes a port number and codec for the user equipment. The memory and the computer program code are further configured to, with the processor, cause the apparatus at least to select an access control transfer function, where the selection of the access control transfer function is based either on a previously provided access control transfer function uniform resource identifier, or a local configuration when no access control transfer function uniform resource identifier was previously provided. The memory and the computer program code are further configured to, with the processor, cause the apparatus at least to transmit a first invite message to the selected access control transfer function. The memory and the computer program code are further configured to, with the processor, cause the apparatus at least to receive a second invite message from the selected access control transfer function, where the second invite message includes a session transfer identifier for reverse single radio voice call continuity populated by the selected access control transfer function. The memory and the computer program code are further configured to, with the processor, cause the apparatus at least to transmit a third invite message to a service centralization and continuity application server. The memory and the computer program code are further configured to, with the processor, cause the apparatus at least to transmit a call confirm/alert message to the user equipment, wherein the call confirm/alert message includes the session transfer identifier for reverse single radio voice call continuity.

According to another embodiment, an apparatus includes receiving means for receiving a mobile call originating setup message from a user equipment, where the mobile call originating setup message includes a port number and codec for the user equipment. The apparatus further includes selecting means for selecting an access control transfer function, where the selection of the access control transfer function is based either on a previously provided access control transfer function uniform resource identifier, or a local configuration when no access control transfer function uniform resource identifier was previously provided. The apparatus further includes transmitting means for transmitting a first invite message to the selected access control transfer function. The apparatus further includes receiving means for receiving a second invite message from the selected access control transfer function, where the second invite message includes a session transfer identifier for reverse single radio voice call continuity populated by the selected access control transfer function. The apparatus further includes transmitting means for transmitting a third invite message to a service centralization and continuity application server. The apparatus further includes transmitting means for transmitting a call confirm/alert message to the user equipment, wherein the call confirm/alert message includes the session transfer identifier for reverse single radio voice call continuity.

According to another embodiment, a non-transitory computer-readable medium includes a computer program stored therein that, when executed by a processor, causes the processor to implement a method. The method includes receiving a mobile call originating setup message from a user equipment, where the mobile call originating setup message includes a port number and codec for the user equipment. The method further includes selecting an access control transfer function, where the selection of the access control transfer function is based either on a previously provided access control transfer function uniform resource identifier, or a local configuration when no access control transfer function uniform resource identifier was previously provided. The method further includes transmitting a first invite message to the selected access control transfer function. The method further includes receiving a second invite message from the selected access control transfer function, where the second invite message includes a session transfer identifier for reverse single radio voice call continuity populated by the selected access control transfer function. The method further includes transmitting a third invite message to a service centralization and continuity application server. The method further includes transmitting a call confirm/alert message to the user equipment, where the call confirm/alert message includes the session transfer identifier for reverse single radio voice call continuity.

According to an embodiment of the invention, a method includes receiving a first invite message from a service centralization and continuity application server. The method further includes selecting an access control transfer function, where the selection of the access control transfer function is based either on a previously provided access control transfer function uniform resource identifier, or a local configuration when no access control transfer function uniform resource identifier was previously provided. The method further includes transmitting a second invite message to the selected access control transfer function. The method further includes receiving a third invite message from the selected access control transfer function, where the third invite message includes a session transfer identifier for reverse single radio voice call continuity populated by the selected access control transfer function. The method further includes transmitting a mobile call terminating setup message to a user equipment, where the mobile call terminating setup message includes the session transfer identifier for reverse single radio voice call continuity. The method further includes receiving a call confirm message from the user equipment, where the call confirm message includes a port number and a codec for the user equipment.

According to another embodiment, an apparatus includes a processor and a memory including computer program code. The memory and the computer program code are configured to, with the processor, cause the apparatus at least to receive a first invite message from a service centralization and continuity application server. The memory and the computer program code are further configured to, with the processor, cause the apparatus at least to select an access control transfer function, where the selection of the access control transfer function is based either on a previously provided access control transfer function uniform resource identifier, or a local configuration when no access control transfer function uniform resource identifier was previously provided. The memory and the computer program code are further configured to, with the processor, cause the apparatus at least to transmit a second invite message to the selected access control transfer function. The memory and the computer program code are further configured to, with the processor, cause the apparatus at least to receive a third invite message from the selected access control transfer function, where the third invite message includes a session transfer identifier for reverse single radio voice call continuity populated by the selected access control transfer function. The memory and the computer program code are further configured to, with the processor, cause the apparatus at least to transmit a mobile call terminating setup message to a user equipment, where the mobile call terminating setup message includes the session transfer identifier for reverse single radio voice call continuity. The memory and the computer program code are further configured to, with the processor, cause the apparatus at least to receive a call confirm message from the user equipment, where the call confirm message includes a port number and a codec for the user equipment.

According to another embodiment, an apparatus includes receiving means for receiving a first invite message from a service centralization and continuity application server. The apparatus further includes selecting means for selecting an access control transfer function, where the selection of the access control transfer function is based either on a previously provided access control transfer function uniform resource identifier, or a local configuration when no access control transfer function uniform resource identifier was previously provided. The apparatus further includes transmitting means for transmitting a second invite message to the selected access control transfer function. The apparatus further includes receiving means for receiving a third invite message from the selected access control transfer function, where the third invite message includes a session transfer identifier for reverse single radio voice call continuity populated by the selected access control transfer function. The apparatus further includes transmitting means for transmitting a mobile call terminating setup message to a user equipment, where the mobile call terminating setup message includes the session transfer identifier for reverse single radio voice call continuity. The apparatus further includes receiving means for receiving a call confirm message from the user equipment, where the call confirm message includes a port number and a codec for the user equipment.

According to another embodiment, a non-transitory computer-readable medium includes a computer program stored therein that, when executed by a processor, causes the processor to implement a method. The method includes receiving a first invite message from a service centralization and continuity application server. The method further includes selecting an access control transfer function, where the selection of the access control transfer function is based either on a previously provided access control transfer function uniform resource identifier, or a local configuration when no access control transfer function uniform resource identifier was previously provided. The method further includes transmitting a second invite message to the selected access control transfer function. The method further includes receiving a third invite message from the selected access control transfer function, where the third invite message includes a session transfer identifier for reverse single radio voice call continuity populated by the selected access control transfer function. The method further includes transmitting a mobile call terminating setup message to a user equipment, where the mobile call terminating setup message includes the session transfer identifier for reverse single radio voice call continuity. The method further includes receiving a call confirm message from the user equipment, where the call confirm message includes a port number and a codec for the user equipment.

BRIEF DESCRIPTION OF THE DRAWINGS

Further embodiments, details, advantages, and modifications of the present invention will become apparent from the following detailed description of the preferred embodiments, which is to be taken in conjunction with the accompanying drawings, wherein:

FIG. 14 illustrates an apparatus according to an embodiment of the invention.

DETAILED DESCRIPTION

Figure 1:
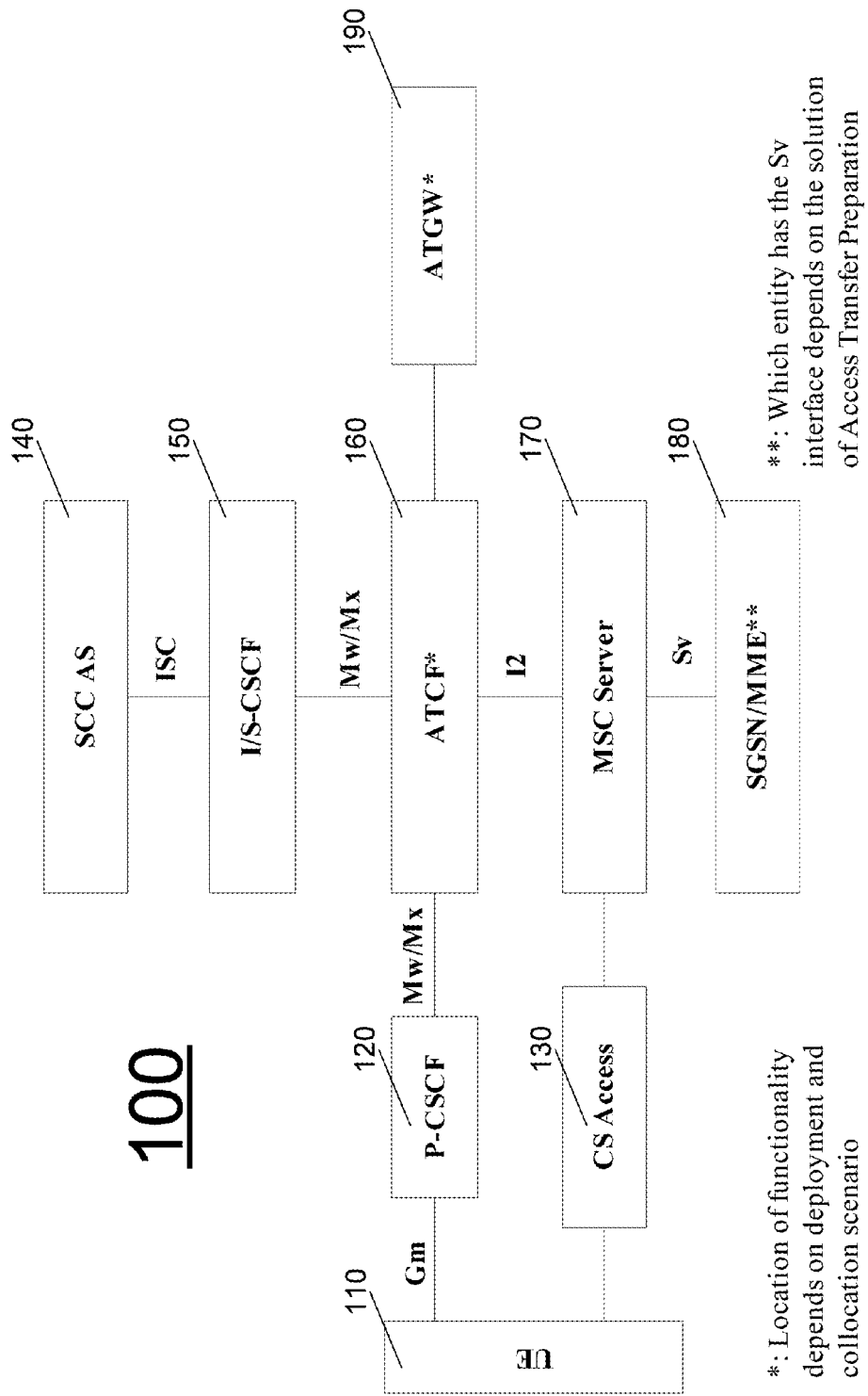
FIG. 1 illustrates a block diagram of a system that implements rSRVCC, according to an embodiment of the invention.

It will be readily understood that the components of the present invention, as generally described and illustrated in the figures herein, may be arranged and designed in a wide variety of different configurations. Thus, the following detailed description of the embodiments of a method, apparatus, system, and computer-readable medium, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "an embodiment," "one embodiment," "another embodiment," "an alternative embodiment," "an alternate embodiment," "certain embodiments," "some embodiments," "different embodiments" or other similar language, throughout this specification refers to the fact that a particular feature, structure, or characteristic described in connection with the embodiment may be included in at least one embodiment of the present invention. Thus, appearances of the phrases "an embodiment," "one embodiment," "another embodiment," "an alternative embodiment," "an alternate embodiment," "in certain embodiments," "in some embodiments," "in other embodiments," "in different embodiments," or other similar language, throughout this specification do not necessarily all refer to the same group of embodiments, and the described features, structures, or characteristics may be combined in any suitable manner in one or more embodiments.

As previously described, rSRVCC refers to voice call continuity from a UTRAN/GERAN telecommunication system to an IMS over E-UTRAN/HSPA telecommunication system for voice calls that are anchored in IMS when the UE is capable of transmitting/receiving on only one of those telecommunication systems at a given time. rSRVCC may be required because operators may want to hand over UEs from a 2G/3G telecommunication system back to an evolved packet system (EPS), for example, to make sure that users get service on a E-UTRAN/HSPA telecommunication system as soon as the E-UTRAN/HSPA telecommunication system becomes available, or to optimize radio network usage and coverage.

In conventional rSRVCC procedures, it has been determined that an access transfer control function (ATCF) is involved throughout the process. Specifically, the ATCF stores information about the UE that is capable for rSRVCC (such as an Internet Protocol (IP) address, port number, and a codec), and remains in the call part for each of these UEs. Therefore, in conventional rSRVCC procedures, the ATCF is required to include a database for the UE information even if the rSRVCC procedure would not be invoked by the MSC server. Thus, requiring the ATCF to store information about each UE in a database is a waste of the ATCF's resources.

Thus, in accordance with an embodiment of the invention, a new rSRVCC procedure is provided where an ATCF is only allocated dynamically during a call setup phase, if the ATCF is needed to support the rSRVCC procedure. According to the embodiment, the UE does not include (i.e., may be devoid of) any rSRVCC information in an initial IMS registration over LTE. If a visited public land mobile network (PLMN) supports SRVCC, the registration is routed via the ATCF. If the ATCF also supports rSRVCC, it includes an ATCF uniform resource identifier (ATCF-URI) in the registration to IMS. The ATCF-URI points to the same ATCF for rSRVCC and enhanced SRVCC (eSRVCC). If they are not the same, the ATCF identification will not be included. This enables the mobile switch center (MSC) server to dynamically allocate an ATCF for rSRVCC during a call set up phase.

During a CS attachment procedure, in accordance with an embodiment, the MSC server performs IMS centralized services (ICS) I2 IMS registration to a service centralization and continuity application server (SCC AS), which is not routed via the ATCF. In other words, a transmission of a registration message may bypass the ATCF. After the ICS I2 IMS registration, the SCC AS transmits its identity (and possibly an ATCF URI, if an ATCF URI has been generated) to the MSC. If the SCC AS does not transmit an ATCF URI, then the MSC server can choose an ATCF based on a local configuration.

During a call setup, in accordance with an embodiment, the UE gives its port number and codec information to the MSC server. The MSC server stores the UE's port number and codec information and routes the call through the ATCF using the ATCF-URI. The MSC server obtains a session transfer identifier for rSRVCC (STI-rSR) from the ATCF in an INVITE message as well as an uplink (UL) IP address and port information for an access transfer gateway (ATGW). The MSC server forwards the STI-rSR to the UE within call setup signaling. In an alternate embodiment, the port number and codec information from the UE can be standardized with a default codec list, such as a codec list for CS, and port number. This way, a UE is not required to transmit a port number and codec information to the MSC server during a call setup procedure. In an alternate embodiment, the STI-rSR may be given to the UE from ATCF during IMS registration when ATCF can also perform rSRVCC.

During SRVCC, in accordance with an embodiment, when the MSC server receives a handover command from a target mobile management entity (MME), the MSC server sends a command to the UE, where the command can include voice connection information, such as an UL IP address, and port information for the ATGW, which the MSC server received during the call setup procedure. At the same time, the MSC server transmits an access transfer preparation message to the ATCF. After a handover to an LTE telecommunication system, the UE transmits an access transfer complete message, using the STI-rSR to the ATCF. The ATCF finalizes the handover by informing the SCC AS that the UE has been handed over to the LTE telecommunication system.

FIG. 1 illustrates a block diagram of a system 100, according to an embodiment of the invention. System 100 includes UE 110. UE 110 is any device used directly by an end user to communicate, such as a mobile telephone, a laptop computer, or any other mobile device. According to an embodiment, UE 110 is enhanced for rSRVCC. Thus, UE 110 can indicate to system 100 and the IMS that UE 100 is rSRVCC capable. UE 110 can pre-allocate ports to be used for a voice call after an rSRVCC handover procedure and inform system 100 about the pre-allocated ports. Alternatively, UE 110 can use pre-defined ports after an rSRVCC handover procedure. UE 110 can inform system 100 about supported codecs that can be used for a voice call after an rSRVCC handover procedure. Alternatively, UE 110 can use a pre-defined codec for a voice call after an rSRVCC handover procedure. In an access transfer preparation procedure, UE 110 can receive information about a voice bearer as part of an rSRVCC handover procedure, and can begin using it as soon as UE 110 is handed over to a target system. In an access transfer preparation procedure, UE 110 can also trigger an establishment of a voice bearer to be used after an rSRVCC handover procedure after performing an IMS registration procedure. Additionally, UE can re-establish a session control of a media after an rSRVCC handover procedure to a target system.

System 100 also includes proxy-call session control function (P-CSCF) 120. P-CSCF 120 is a session initiation protocol (SIP) proxy that is a first point of contact for an IMS terminal. P-CSCF 120 sits on the path of all signaling within system 100 and can inspect every signal within system 100. P-CSCF 120 can provide subscriber authentication and can establish a security association with an IMS terminal. In an access transfer preparation procedure, P-CSCF-120 can interact with a policy and charging rules function (PCRF) for a preparation of the access transfer preparation procedure when informed by an ATCF (such as ATCF 160, described below) that the access transfer preparation procedure will occur.

System 100 also includes CS access 130. CS access 130 represents a network connection to a CS telecommunication system. UE 110 utilizes CS access 130 to connect to the CS telecommunication system, in addition to being connected to system 100. Furthermore, an MSC server of system 100 (such as MSC server 170, described below) is also connected to the CS telecommunications system, using CS access 130.

System 100 also includes SCC AS 140. SCC AS 140 provides IMS-based mechanisms for enabling continuity of multimedia sessions. SCC AS 140 can implement the following procedures: an access transfer procedure; an inter-UE transfer procedure, a terminating access domain selection procedure, and a media flow handling procedure for handling multiple media flows. With respect to the access transfer procedure, SCC AS 140 analyzes information required for the access transfer procedure, decides which access transfer scenario should be executed, and rejects an access transfer request if the access transfer request is not aligned with an operator policy. SCC AS 140 further retrieves from a home subscriber server (HSS), after third-party registration, a correlation mobile subscriber integrated services digital network number (C-MSISDN) bound to an IMS private user identity stored in a user profile in the HSS. SCC AS 140 further correlates an access transfer request with an anchored session, using information provided in an incoming SIP INVITE message. SCC AS 140 further correlates an access leg created by an access transfer update message from an ATCF (such as ATCF 160, described below) with a remote leg. SCC AS 140 further clears any existing session transfer number for SRVCC (STN-SR) that has been set and provided to the HSS. When ATCF 160 is used, SCC AS 140 provides, after a successful IMS registration procedure, the C-MSISDN and a routable access-transfer update—session transfer identifier (ATU-STI) to ATCF 160.

SCC AS 140 further: executes a transfer of an IMS session between different telecommunication systems; implements a third party call control upon a session establishment; provides access transfer specific charging data; decides, based on an analysis of the various service continuity related input factors, whether to update a provisioned operator policy for an access transfer procedure; generates and updates an operator policy by transmitting the operator policy to UE 110, including a priority between the operator policy, and user preferences that could be used to initiate an access transfer procedure for an ongoing session; and, in case SCC AS 140 supports video SRVCC (vSRVCC), provides information to a MSC server (such as MSC server 170, described below) related to whether the most recently active bi-directional session is voice, or voice and video, so that SCC AS 140 can determine whether it should perform a SRVCC procedure or a vSRVCC procedure. In addition, if indicated by MSC server 170 that MSC server 170 is enhanced for rSRVCC, SCC AS 140 can notify MSC server 170 of the STN-SR of ATCF 160 when changes to the STN-SR occur (such as during an initial IMS registration procedure from UE 110 over PS access).

System 100 also includes I/S-CSCF 150. I/S-CSCF 150 represents an interrogating-CSCF (I-CSCF), a serving-CSCF (S-CSCF), or a combination of the two. An I-CSCF is a SIP function that is located at an edge of an administrative domain. Its IP address is published in a domain name system (DNS) of the administrative domain, so that remote servers can find it, and use it as a forwarding point, such as a registering point, for SIP packets to the domain. The I-CSCF also queries an HSS to retrieve an address of an S-CSCF and assigns the address to a user performing SIP registration, and also forwards SIP requests and responses to the S-CSCF. An S-CSCF is a SIP server that is a central node of a signaling plane and that performs session control. The S-CSCF sits on a path of all signaling messages of locally registered users and can inspect every message. The S-CSCF downloads user profiles from an HSS and uploads user-to-S-CSCF associations to the HSS. The S-CSCF also handles SIP registrations, which allows the S-CSCF to bind an IP address of a user with an SIP address. The S-CSCF also decides to which application server(s) an SIP message will be forwarded to, provides routing services, and enforces a policy of a network operator.

System 100 also includes ATCF 160, which is a function within system 100. In certain embodiments, ATCF 160 is located as a separate functional entity within system 100. However, in alternate embodiments, ATCF 160 is co-located with one of the other existing functional entities within system 100, such as P-CSCF 120. In a conventional SRVCC procedure that is enhanced with ATCF, ATCF 160 is included in a session control plane for a duration of a call before and after an access transfer procedure. However, in certain embodiments of the invention, as will be described below in greater detail, in an rSRVCC procedure that is enhanced with ATCF, ATCF 160 is only included in a session control plane when ATCF 160 is needed for an access transfer procedure. ATCF 160 can, based on a policy of an operator, allocate a STN-SR, include itself for the SIP sessions, and instruct an ATGW (such as ATGW 190, described below) to anchor a media path for originating and terminating sessions. ATCF 160 can also keep track of sessions (either in an alternating state, active or held) to be able to perform an access transfer procedure for a selected session. ATCF 160 can also perform an access transfer procedure and update ATGW 190 with a new media path for a CS access leg without requiring an update of a remote leg. After an access transfer procedure is complete, ATCF 160 can update SCC AS 140 that the access transfer procedure has taken place to ensure that a termination access domain selection (T-ADS) has information on a currently used telecommunications system. ATCF 160 can also handle scenarios where an access transfer procedure fails.

In addition, after an access transfer procedure, and based on a local policy, ATCF 160 can remove ATGW 190 from a media path, using a remote end update procedure. If a MSC server-assisted mid-call feature is used, then SCC AS 140 can provide session state information on an altering, held, and/or conference state to ATCF 160 for any transferred session. ATCF 160 does not modify any dynamic STI that is exchanged between UE 110 and SCC AS 140.

Additionally, in a registration procedure from an MSC server (such as MSC server 170, described below) that is enhanced for rSRVCC, ATCF 160 can include itself to a path for future session establishments over CS and correlate a registration with a related PS registration, according to a conventional rSRVCC procedure. However, in certain embodiments of the invention, as will be described below in greater detail, in an rSRVCC procedure that is enhanced with ATCF, ATCF 160 is only included in a session control plane when ATCF 160 is needed for an access transfer procedure. ATCF 160 can also make a media anchoring decision with additional criteria of UE 110's rSRVCC capability for session setups initiated from, or destined to, MSC server 170. ATCF 160 can also correlate session transfer procedures initiated by UE 110 and MSC server 170 enhanced for rSRVCC. If media anchoring has been made at a session establishment, ATCF 160 can also perform an access transfer procedure and update an ATGW (such as ATGW 190, described below) with a new media path for the new PS access leg, without requiring an update of the remote leg. Alternately, if media anchoring has not been made at a session establishment, ATCF 160 can optionally anchor the call in ATGW 190 as part of the rSRVCC procedure by establishing a new media path between a media gateway (MGW) and ATGW 190 for the PS access leg, and can update the remote leg once UE 110 has been handed over to the target telecommunications system and performs the service continuity procedure.

System 100 also includes MSC server 170. MSC server 170 constitutes an interface between system 100 and fixed networks. MSC server 170 performs all necessary functions in order to handle circuit-switched services to and from UEs (such as UE 110). In addition to the standard functions to handle circuit-switched services, MSC server 170 can provide the following functions as needed for support of SRVCC: handling a relocation preparation procedure requested for a voice component from a serving general packet radio service support node (SGSN)/MME; invoking a session transfer procedure or emergency session transfer procedure from IMS to CS; coordinating a CS handover procedure and session transfer procedure; handling a mobile application part (MAP) update location procedure without the procedure being triggered from UE 110; and in case of an emergency session, conditionally transmitting a MAP subscription location report to a gateway mobile location center (GMLC) to support location continuity. Additionally, MSC server 170 can be enhanced for support of ICS, and can provide the following functions for an identified ICS user: processing user network signaling received over a CS access (such as an A/Iu interface and E interface) for internetworking with IMS SIP and vice-versa; controlling MGW functions to enable interworking between CS access and real-time transport protocol (RTP) bearers; performing interworking to support multimedia calls in ICS; implementing a communication service setting conversion function between CS signaling and communication service setting procedures; and disregarding any supplementary services or intelligent network (IN) triggers that may be present in a user profile. In addition, MSC server 170 can be enhanced for rSRVCC, and can provide the following functions in support of rSRVCC: discovering an ATCF address that is not already available and using ATCF 160 as an outgoing proxy when performing IMS registration where ATCF 160 is allocated during an IMS registration procedure for UE 110 and decides to remain in the session path; initiating a session transfer procedure from CS to IMS; and initiating a CS to PS handover procedure for a handover of a voice component to a target cell via an Sv interface.

System 100 also includes SGSN/MME 180. SGSN/MME 180 represents a SGSN, a MME, or a combination of the two. SGSN/MME 180 can be enhanced for rSRVCC. SGSN/MME 180 can handle a relocation preparation procedure requested from MSC server 170, where MSC server 170 enhanced for rSRVCC. SGSN/MME 180 can perform a bearer reservation procedure for voice media in a target communications system. SGSN/MME 180 can also establish a voice bearer without allocating radio resources for it. SGSN/MME 180 can further coordinate a PS handover procedure and a CS to PS handover procedure when both procedures are performed. SGSN/MME 180 can also retrieve PDP context related information if a PS-PS handover procedure is not performed at the same time as an rSRVCC handover procedure.

System 100 also includes ATGW 190. ATGW 190 is controlled by ATCF 160, and if SRVCC enhanced with ATCF is used, stays in the session media path for a duration of a call and after an access transfer procedure, based on a local policy of a serving network. ATGW 190 supports transcoding after a SRVCC handover procedure in case the media that was used prior to the handover procedure is not supported by MSC server 170. Depending on placement of ATCF 160, ATGW 190 may be comprised of different physical nodes, such as an IMS access gateway (IMS-AGW) or a translation gateway (TrGW).

One of ordinary skill in the art would readily appreciate that the configuration of system 100 illustrated in FIG. 1 is an example configuration, and that system 100 can be configured according to alternate configurations and still be within a scope of the invention.

System 100 has the following requirements for an IMS registration procedure when UE 110 registers with system 100. During the IMS registration procedure via a Gm interface, UE 110 indicates its port number and codec to ATCF 160 for a downlink (DL) media direction after rSRVCC. ATCF 160 stores this information and uses it to control ATGW 190 during an rSRVCC procedure for media switching ATCF 160 returns a STI-rSR to UE 110 as part of an IMS registration response over the Gm interface. MSC server 170 (which is enhanced for rSRVCC) initiates an ICS I2 registration toward ATCF 160 to ensure the IMS signaling is traversed via ATCF 160 during a CS call origination and termination. Further specifics of the IMS registration procedure are described below in relation to FIG. 2.

Figure 2:
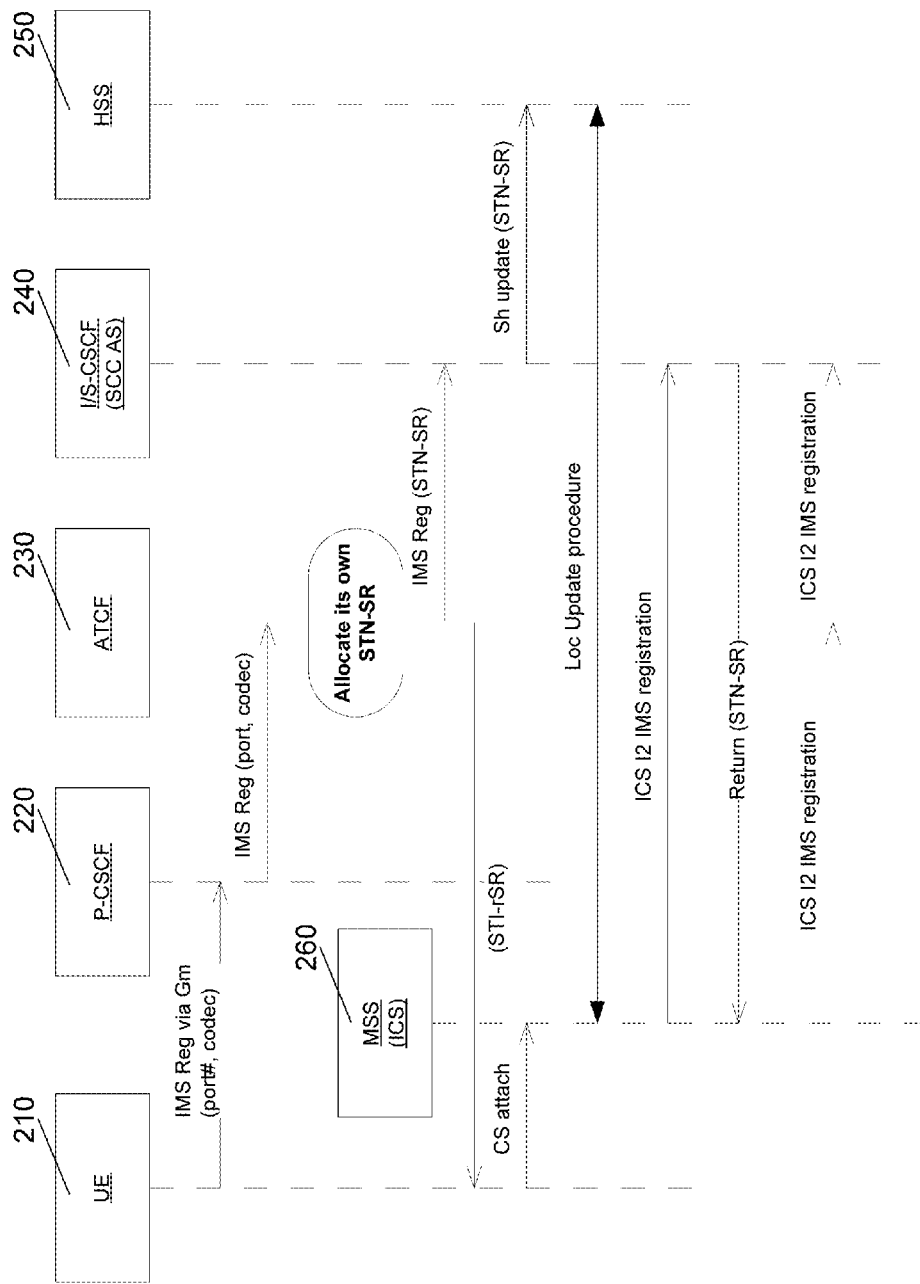
FIG. 2 illustrates a sequence diagram of an IMS registration procedure for rSRVCC.

FIG. 2 illustrates a sequence diagram of an IMS registration procedure for rSRVCC. According to the IMS registration procedure, UE 210 transmits an IMS registration request via a Gm interface to P-CSCF 220. The IMS registration requests includes a port number and codec of UE 210. P-CSCF 220 receives the IMS registration request and transmits the IMS registration request to ATCF 230. ATCF 230 stores the port number and codec of UE 210 for a DL media direction after rSRVCC. ATCF 230 can store the port number and codec of UE 210 in, for example, a database that ATCF is operatively connected to. Thus, ATCF is required to retain UE data, and may be required to have a database storage to store the UE data.

ATCF 230 subsequently allocates its own STN-SR. ATCF 230 stores the STN-SR in an IMS registration message, and transmits the IMS registration message to I/S-CSCF (SCC AS) 240, where I/S-CSCF (SCC AS) 240 stores the STN-SR within an Sh update message and transmits the Sh update message to HSS 260. After transmitting the IMS registration message, ATCF 230 transmits an IMS registration response to UE 210 over the Gm interface. The IMS registration response includes an STI-rSR.

UE 210 then initiates a CS attach procedure by transmitting a CS attach message to MSC server (MSS) (ICS) 250. Upon receiving the CS attach message, MSS (ICS) 250 initiates a location update procedure. As part of the location update procedure, MSS (ICS) 250 initiates an ICS I2 registration procedure for UE 210. As part of the ICS I2 registration procedure, MSS (ICS) 250 derives a domain name from UE 210's identity, and discovers the address of an appropriate I-CSCF (i.e., I/S-CSCF (SCC AS) 240). MSS (ICS) 250 subsequently transmits an ICS I2 IMS registration message to I/S-CSCF (SCC AS) 240. In response, I/S-CSCF (SCC AS 240) transmits an ICS I2 IMS registration response to MSS (ICS) 250, where the ICS I2 IMS registration response includes the STN-SR. MSS (ICS) 250 also transmits an ICS I2 IMS registration message to ATCF 230, which ATCF 230 receives and transmits to I/S-CSCF (SCC AS) 240. Thus, an ATCF is selected during IMS registration, and this ATCF is used throughout a lifetime of UE 210, until UE 210 performs another IMS registration via Gm over GPRS/LTE.

Figure 3:
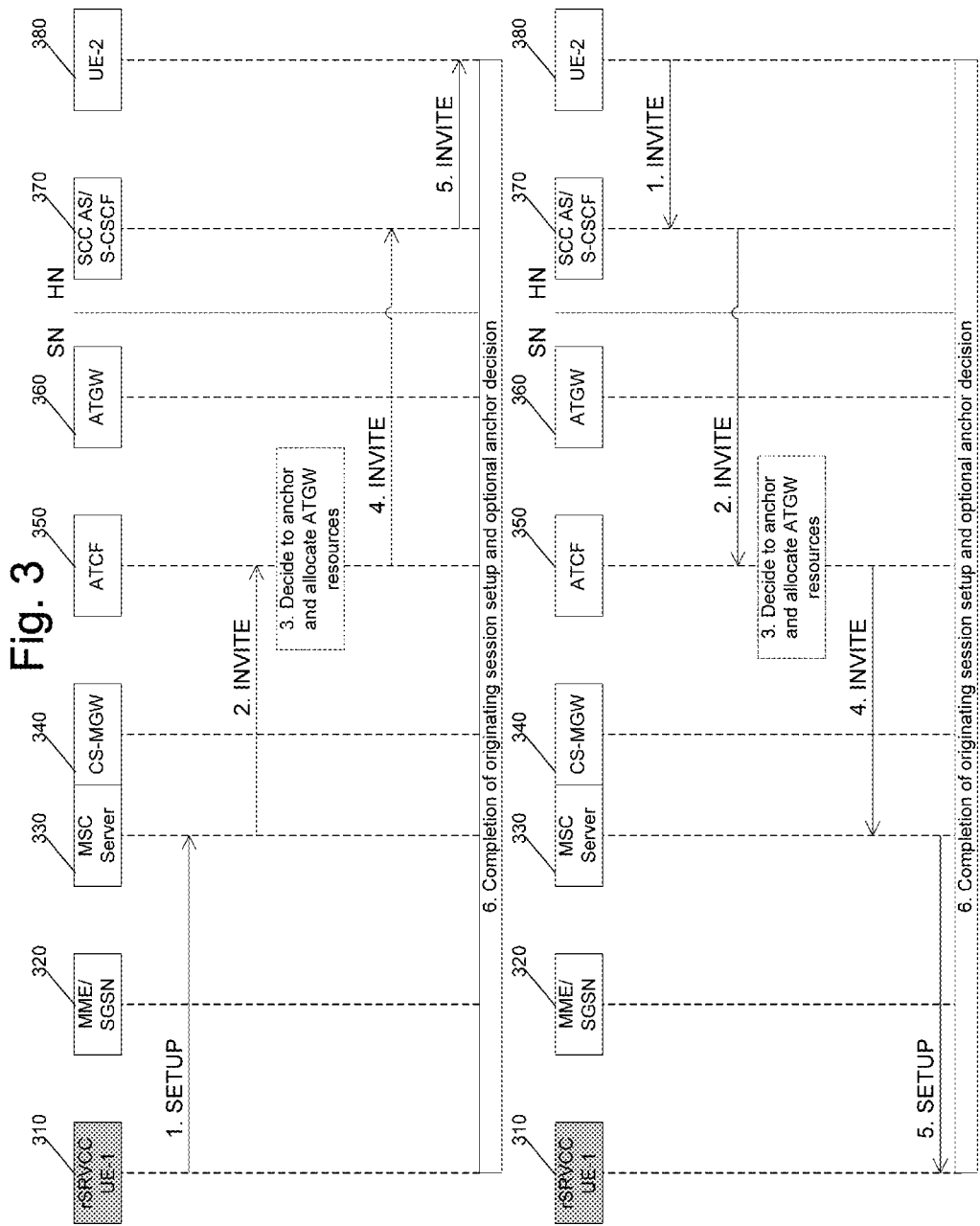
FIG. 3 illustrates a sequence diagram of a setup for a CS call originating session procedure and a setup for a CS call terminating session procedure, where each procedure includes anchoring in an ATCF.

FIG. 3 illustrates a sequence diagram of a setup for a CS call originating session procedure and a setup for a CS call terminating session procedure, where each procedure includes anchoring in an ATCF. In a CS call origination procedure, rSRVCC UE-1 310 transmits a SETUP message to MSC server 330. MSC server 330 subsequently transmits an INVITE message to ATCF 350. ATCF 350 decides to anchor and allocate resources of ATGW 360 for the CS call origination procedure. Subsequently, ATCF 350 transmits an INVITE message to SCC AS/S-CSCF 370. SCC AS/S-CSCF 370 receives the INVITE message and transmits an INVITE message to UE-2 380. A setup of an originating session is subsequently completed, where the setup optionally includes an anchor decision by ATCF 350. As illustrated in FIG. 3, ATCF 350 is kept in the call path during the setup phase of the CS call origination procedure.

In a CS call termination procedure, UE-2 380 transmits an INVITE message to SCC AS/S-CSCF 370. SCC AS/S-CSCF 370 subsequently transmits an INVITE message to ATCF 350. ATCF 350 decides to anchor and allocate resources of ATGW 360. Subsequently, ATCF 350 transmits an INVITE message to MSC server 330. MSC server 330 subsequently transmits a SETUP message to rSRVCC UE-1 310. A setup of an originating session is subsequently completed, where the setup optionally includes an anchor decision by ATCF 350. As illustrated in FIG. 3, ATCF 350 is also kept in the call path during the setup phase of the CS call termination procedure.

Figure 4:
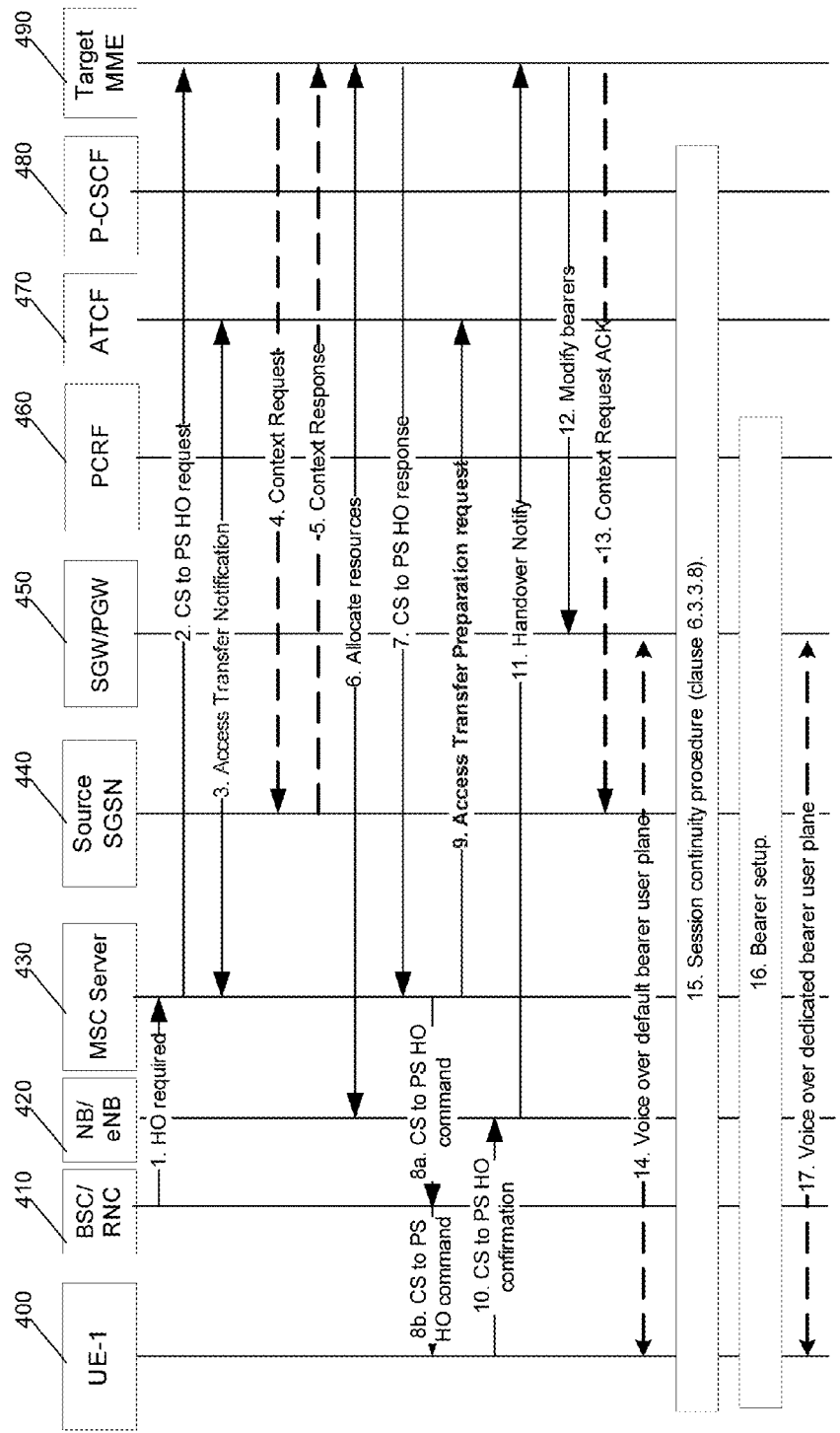
FIG. 4 illustrates a sequence diagram for an access transfer preparation procedure.

FIG. 4 illustrates a sequence diagram for an access transfer preparation procedure. Base station controller (BSC)/radio network controller (RNC) 410 transmits a handover (HO) required message to MSC server 430 including an indication that the HO is for rSRVCC. If MSC server 430 is the target MSC server, then MSC server 430 forwards the HO required message to an anchor MSC server (not shown in FIG. 4). MSC server 430 subsequently transmits a SRVCC CS to PS HO request message to target MME 490. If required, an international mobile subscriber identity is provided for identifying UE-1 400. MSC server 430 transmits an access transfer notification message to ATCF 470. The access transfer notification message can be in the format of a SIP INVITE message or re-INVITE message, which indicates to the ATCF 470 that it should prepare for a transfer of media to PS. ATCF 470 allocates media ports on an ATGW (not shown in FIG. 4). The media ports and codecs allocated by ATCF 470 are provided to MSC server 430 in a response message. ATCF 470 retrieves port numbers/codes from UE-1 400 in its IMS registration. ATCF 470 is able to correlate the IMS registration made by UE-1 400, and the registration made by MSC server 430 on behalf of UE-1 400, for example, based on the C-MSISDN or on the international mobile equipment identity (IMEI) derived instance identity used in both of those registrations. In addition, a UL IP address and port number for the ATGW can also be provided to MSC server 430 in the response message.

If target MME 490 does not have a UE context, it transmits a context request message to source SGSN 440 using a temporary mobile subscriber identity (TMSI) provided through a SGSN (i.e., P-TMSI) and a routing area identification (RAI) to find the original SGSN. Source SGSN 440 responds to target MME 490 with a context response message including all UE contexts. Target MME 490 subsequently allocates resources in E-UTRAN.

After allocating resources, target MME 490 returns a SRVCC CS to PS HO response to MSC server 430. MSC server transmits an HO required acknowledgment message to BSC/RNC 410, possibly via a target MSC, and BSC/RNC 410 transmits an HO command message to UE-1 400, indicating a CS to PS handover. MSC server 430 also includes within the HO command message the IP address/ports and selected codec for the ATGW.

Subsequently, MSC server 430 transmits an access transfer preparation request message to ATCF 470. In a scenario where ATCF 470 includes media anchored in an ATGW, MSC server 430 transmits the access transfer preparation request message (such as a SIP re-INVITE or provisional response acknowledgement (PRACK) message) to ATCF 470 to trigger ATCF 470 (and the corresponding ATGW) to have a media path switched to the IP address/port of UE-1 400. In a scenario where ATCF 470 does not include media anchored in an ATGW, MSC server 430 transmits the access transfer preparation request message to ATCF 470, and the media path between ATCF 470 (and the corresponding ATGW) and MSC server 430 is established.

UE-1 400 subsequently transmits an HO confirmation message to node B (NB)/evolved node B (eNB) 420. NB/eNB 420 then transmits a handover notify message to target MME 490. Target MME 490 transmits a modify bearer request message to serving gateway (SGW)/packet data network gateway (PGW) 450. Specifically, the target MME transmits the modify bearer request message to the SGW, which is forwarded to the PGW to update PS bearer contexts. The target MME subsequently transmits an context request acknowledge message to source SGSN 440. The voice media is then started directly. UE-1 400 subsequently initiates a session continuity procedure towards ATCF 470. As a result of the session continuity procedure, a bearer setup procedure is performed, where the bearer setup procedure is initiated by P-CSCF 480. The voice media is subsequently sent in the dedicated bearer.

Figure 5:
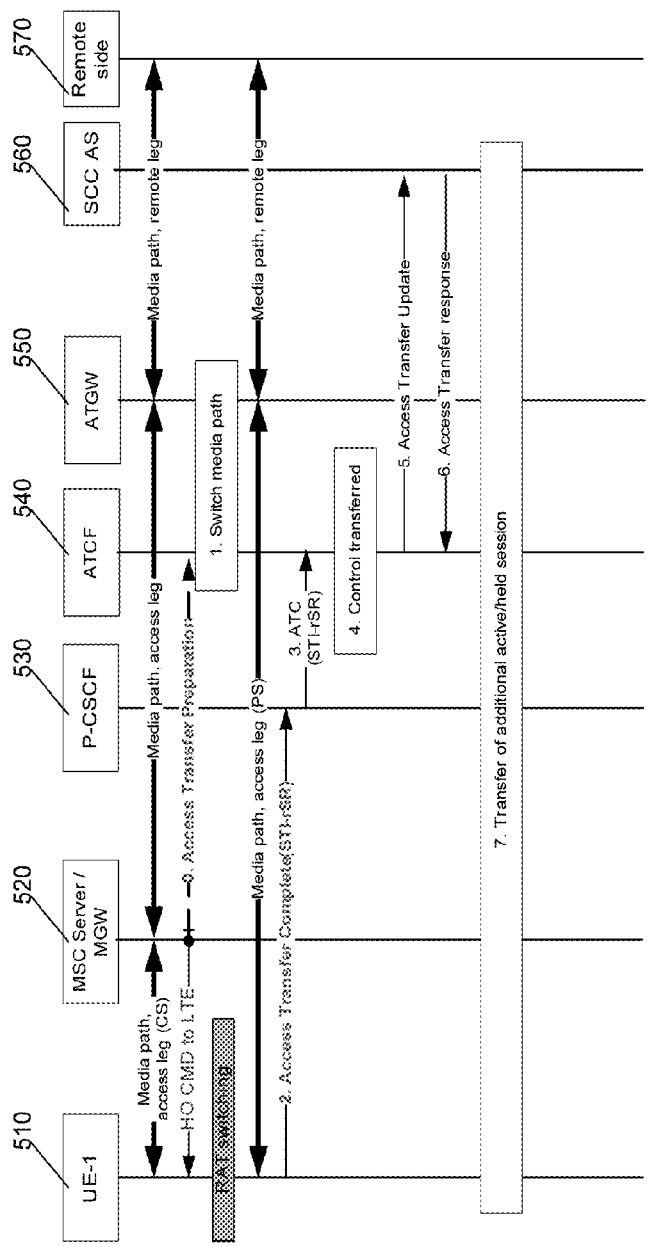
FIG. 5 illustrates a sequence diagram for an IMS session continuity procedure that is part of an overall rSRVCC procedure.

FIG. 5 illustrates a sequence diagram for an IMS session continuity procedure that is part of an overall rSRVCC procedure. The IMS session continuity procedure starts when the media path switching is requested from MSC server/MGW 520 during the access transfer preparation procedure previously described in relation to FIG. 4. MSC server/MGW 520 transmits an access transfer preparation request to ATCF 540. When receiving the access transfer preparation request message from MSC server/MGW 520, ATCF 540 updates ATGW 550 to switch the media path to the PS access leg. In certain scenarios, the access media leg is switched to the access media leg of a pre-established session.

When UE-1 510 has moved to PS, it can receive media on the pre-decided ports. UE-1 510 re-establishes session control of the media by transmitting an access transfer complete request message to P-CSCF 530. The access transfer complete request message can be an SIP INVITE request message. The access transfer complete request message can include an STI-rSR obtained during the IMS registration procedure previously described in relation to FIG. 2. P-CSCF 530 subsequently forwards the access transfer complete request message (including the STI-rSR) to ATCF 540.

ATCF 540 correlates the access transfer complete request message with the access transfer preparation request message previously sent by MSC server/MGW 520 and ongoing sessions, and moves a session control of the session to the new access leg. In certain scenarios, ATCF 540 informs UE-1 510 to use a codec that the original session used if possible. After receiving the access transfer complete request message, ATCF 540 reestablishes a communication with SCC AS 560 and updates SCC AS 560 that the transfer has taken place by transmitting an access transfer update message to SCC AS 560. SCC AS 560 confirms by transmitting an access transfer response message to ATCF 540. Subsequently, UE can initiate a transfer of any additional active or held session.

The procedures discussed above assume an ATCF that can store UE information (such as an IP address, port number, and codec for a DL media direction after rSRVCC). In order for an ATCF to store this UE information, the ATCF must have some type of storage capability, such as operatively being connected to having a database. However, there could be many UEs registered in the network, but only a few require rSRVCC. Because an ATCF's resources are allocated during IMS registration, and may not be used at all if the UE does not require rSRVCC, the resources of the ATCF can be wasted. Furthermore, if a serving telecommunication system does not support eSRVCC, then there is no reason to select an ATCF during IMS registration. Instead, an ATCF can be dynamically selected by an MSS during an originating session or a terminating session. Furthermore, SW maintenance or upgrade requires careful consideration to avoid database corruption.

Certain embodiments of the invention introduce modifications to three phases of the rSRVCC procedure: (1) at initial IMS registration over GPRS/LTE; (2) when a user attaches to a CS domain; and (3) during CS call setup. These modifications are described below in greater detail in relation to FIGS. 6-13.

Figure 6:
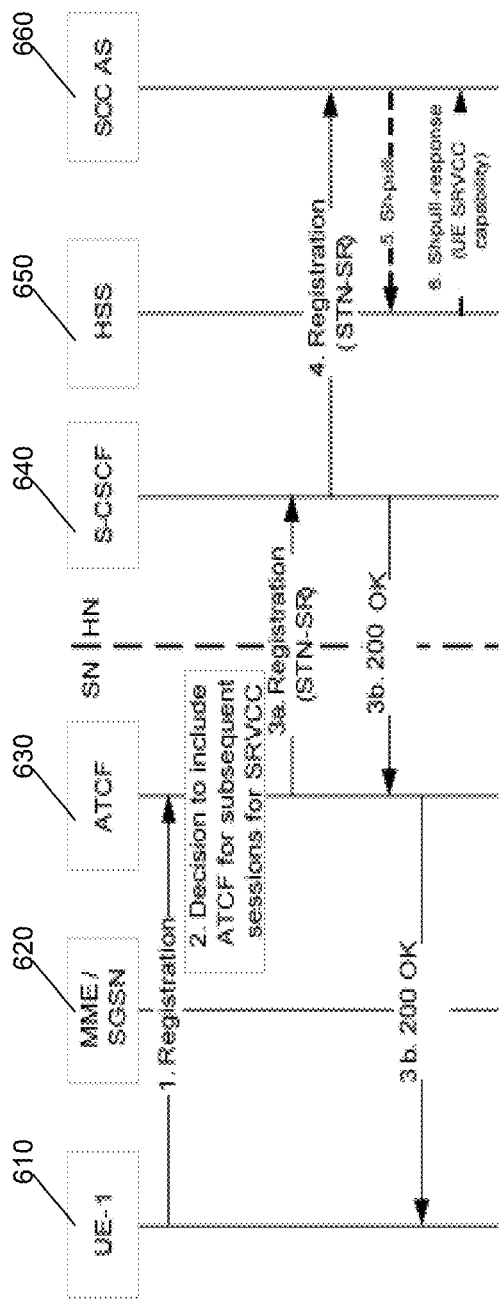
FIG. 6 illustrates a sequence diagram of an IMS registration procedure for rSRVCC using ATCF enhancements, according to an embodiment of the invention.

FIG. 6 illustrates a sequence diagram of an IMS registration procedure for rSRVCC using ATCF enhancements, according to an embodiment of the invention. UE-1 610 transmits an initial SIP REGISTER request message to ATCF 630. ATCF 630 decides, based on operator policy, and if the home network supports SRVCC enhanced with ATCF, to allocate a STN-SR. ATCF 630 can include itself in the signaling path for subsequent messages during the registration procedure. If allocated, the STN-SR is included in the request message that is forwarded to S-CSCF 640. S-CSCF 640 transmits the SIP REGISTER request message to SCC AS 660, as well as transmits an OK acknowledgement message to ATCF 630, where ATCF 630 forwards the OK acknowledgment message to UE-1 610. Depending on the operator policy, SCC AS 660 transmits a Sh-Pull message to HSS 650 in order to know whether the UE is SRVCC capable, and to retrieve the STN-SR stored in HSS 650. HSS 650 replies to SCC AS 660 with a Sh-Pull response message including SRVCC capability of UE-1 610 if available, and the STN-SR if available.

Figure 7:
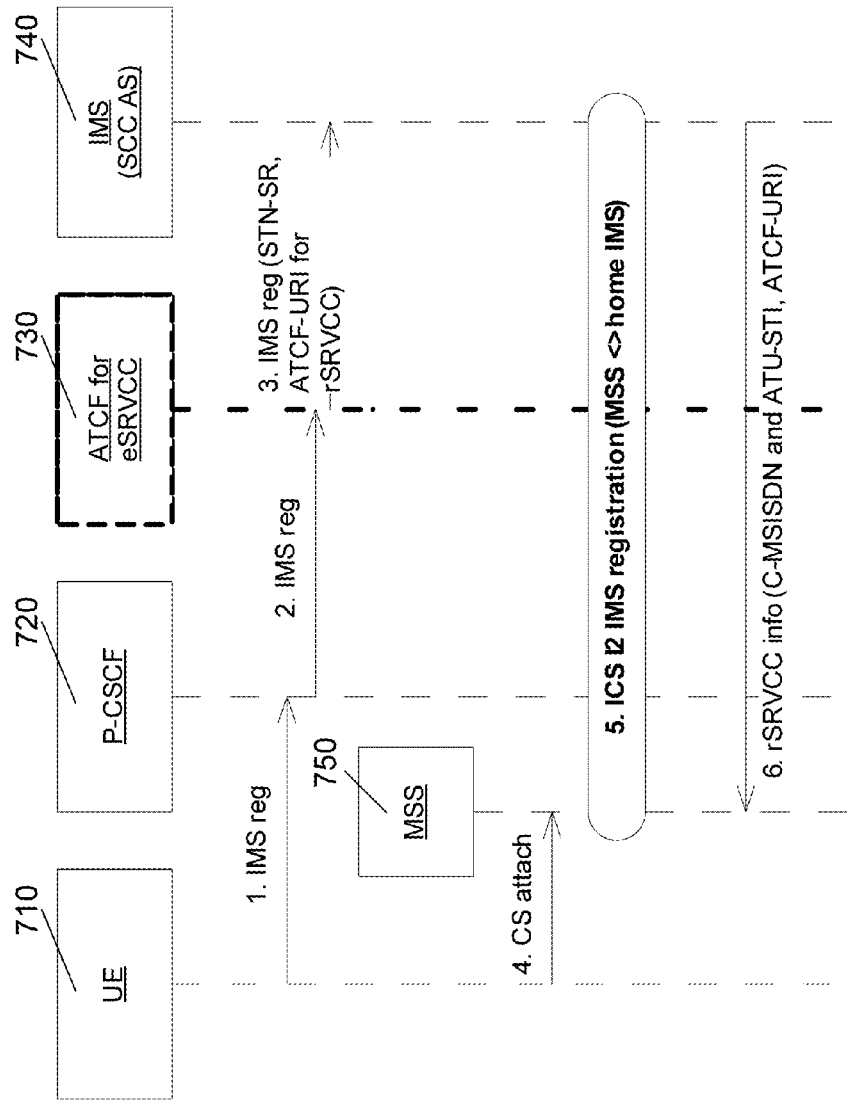
FIG. 7 illustrates a sequence diagram of an IMS registration procedure for rSRVCC, according to an embodiment of the invention.

FIG. 7 illustrates a sequence diagram of an IMS registration procedure for rSRVCC, according to an embodiment of the invention. UE 710 performs an IMS registration procedure via a Gm interface by transmitting an IMS registration message to P-CSCF 720. The IMS registration message may not include (i.e., may be devoid of) any specific rSRVCC information. If a visited PLMN supports eSRVCC then P-CSCF 720 may forward the IMS registration message to ATCF for eSRVCC 730 (i.e., ATCF 730). ATCF 730 may allocate an STN-SR and include the STN-SR within the IMS registration message. If ATCF 730 also supports rSRVCC, then ATCF 730 may also include an ATCF-URI within the IMS registration message. The ATCF-URI is used for pointing to the same ATCF (i.e., ATCF 730) used during an eSRVCC procedure for an rSRVCC procedure. The ATCF-URI may be optional, and may be utilized if the same ATCF is used for both eSRVCC and rSRVCC. If an ATCF used for eSRVCC is different from an ATCF used for rSRVCC, then the ATCF-URI may not be included in the IMS registration message. ATCF 730 transmits the IMS registration message to IMS (SCC AS) 740. If the ATCF 730 is also used for rSRVCC, ATCF can return STI-rSR to the UE as part of the IMS registration response.

Subsequently, UE 710 may initiate a CS attach procedure by transmitting a CS attach message to MSS 750. Upon receiving the CS attach message, MSS 750 may initiate an ICS I2 registration procedure for UE 710. The ICS I2 registration procedure may be similar to the ICS I2 registration procedure previously described in relation to FIG. 2, in that an ICS I2 registration message is transmitted to IMS (SCC AS) 740. However, one important difference from the ICS I2 registration procedure previously described, is that an ICS I2 registration message may not be routed to ATCF 730 as it is transmitted to IMS (SCC AS) 740. In other words, the transmission of the ICS I2 registration message may bypass ATCF 730 as it is transmitted to IMS (SCC AS) 740. After the ICS I2 registration procedure is completed, IMS (SCC AS) 740 may transmit its identity (i.e., C-MSISDN and ATU-STI) to MSS 750 via a registration response message, such as a SIP message. If IMS (SCC AS) 740 received an ATCF-URI, then the ATCF-URI may also be transmitted to MSS 750 via the registration response message (e.g., SIP message).

Figure 8:
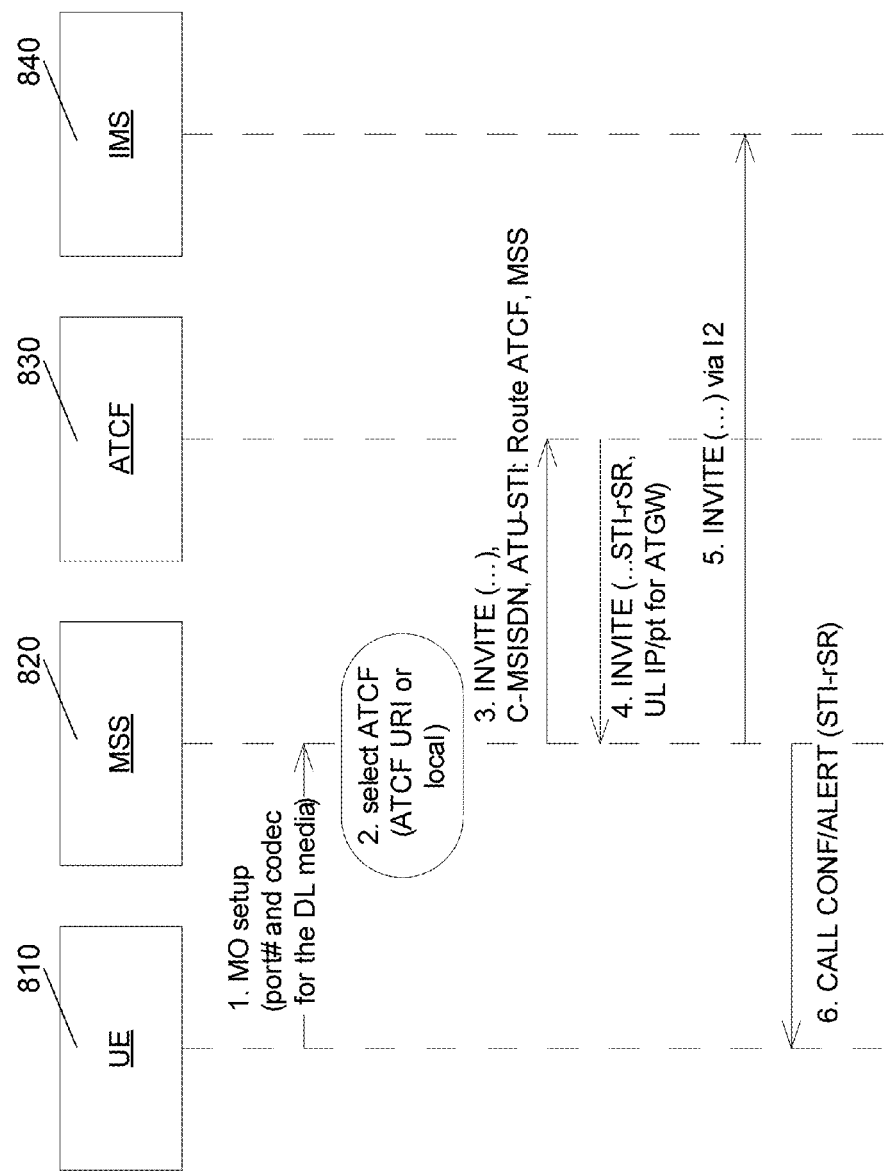
FIG. 8 illustrates a sequence diagram of a setup for a mobile call originating session procedure, according to an embodiment of the invention.

FIG. 8 illustrates a sequence diagram of a setup for a mobile call originating session procedure, according to an embodiment of the invention. During the setup for a mobile call originating session procedure, MSS 820 may route the call through an ATCF that is for rSRVCC (i.e., ATCF 830). More specifically, UE 810 may transmit a mobile call originating setup message to MSS 820, where UE 810 may include information for receiving voice media on PS access, such as IP address, port number and codec used by the UE for a DL media direction within the mobile call originating setup message. MSS 820 may subsequently store the port number and codec for UE 810, and select ATCF 830. If MSS 820 received an ATCF-URI from a SCC AS (not shown in FIG. 8) during an IMS registration procedure, as described in relation to FIG. 7, MSS 820 may use the ATCF-URI to select ATCF 830. However, if MSS 820 did not receive an ATCF-URI from the SCC AS during the IMS registration procedure, as described in relation to FIG. 7, then MSS 820 may select ATCF 830 based on a local configuration.

According to the embodiment, routing can be done by "loose routing" so that MSS 820 can populate its own address, as well as an address of ATCF 830, within an SIP INVITE message. This allows ATCF 830 to transmit the SIP INVITE message back to MSS 820 after it performed its anchoring functionalities. Furthermore, MSS 820 may include a C-MSISDN and ATU-STI that it previously received from an SCC AS within the SIP INVITE message. Subsequently, MSS 820 may transmit the INVITE message (including the C-MSISDN, ATU-STI, address of ATCF 830, and address of MSS 820) to ATCF 830. ATCF 830 may subsequently anchor the call in an ATGW and transmit an INVITE message to MSS 820. The INVITE message may include a STI-rSR that is populated by ATCF 830. If ATCF has previously giving the STI-rSR during IMS registration to UE this inclusion is optional (i.e., only for updating STI-rSR by ATCF). The INVITE message may further include a UL IP address and port number for the ATGW, which may be also populated by ATCF 830. Subsequently, MSS 820 may transmit an INVITE message to IMS 840 via I2. After MSS 820 transmits the INVITE message, MSS 820 may transmit a CALL CONF/ ALERT message to UE 810, where the CALL CONF/ALERT message may include the STI-rSR.

Figure 9:
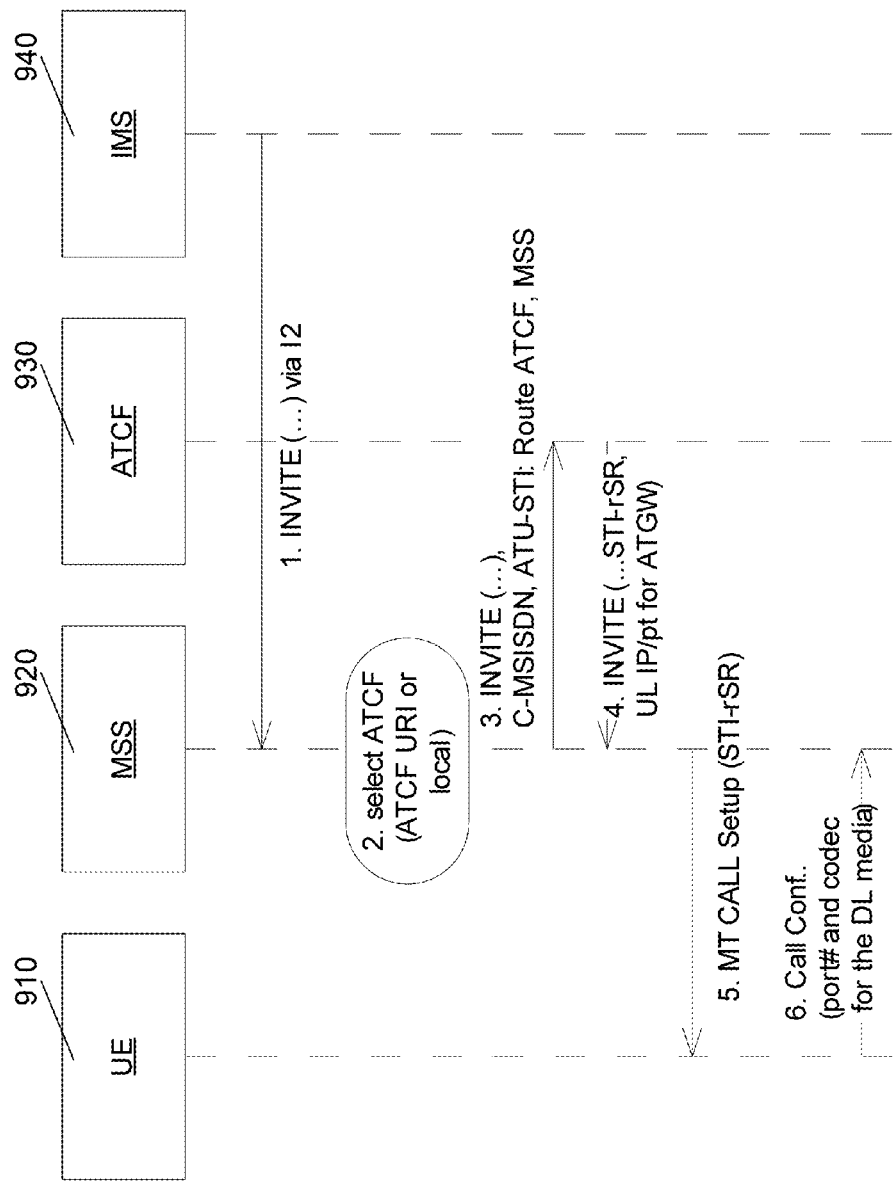
FIG. 9 illustrates a sequence diagram of a setup for a mobile call terminating session procedure, according to an embodiment of the invention.

FIG. 9 illustrates a sequence diagram of a setup for a mobile call terminating session procedure, according to an embodiment of the invention. During the setup for a mobile call terminating session procedure, MSS 820 may route the call through an ATCF that is for rSRVCC (i.e., ATCF 830). More specifically, IMS 940 may transmit an INVITE message to MSS 920 via I2. MSS 920 may subsequently select ATCF 930. If MSS 920 received an ATCF-URI from a SCC AS (not shown in FIG. 9) during an IMS registration procedure, as described in relation to FIG. 7, MSS 920 may use the ATCF-URI to select ATCF 930. However, if MSS 920 did not receive an ATCF-URI from the SCC AS during the IMS registration procedure, as described in relation to FIG. 7, then MSS 920 may select ATCF 930 based on a local configuration.

According to the embodiment, routing can be done by "loose routing" so that MSS 920 can populate its own address, as well as an address of ATCF 930, within an SIP INVITE message. This allows ATCF 930 to transmit the SIP INVITE message back to MSS 920 after it performed its anchoring functionalities. Furthermore, MSS 920 may include a C-MSISDN and ATU-STI that it previously received from an SCC AS within the SIP INVITE message. Subsequently, MSS 920 may transmits the INVITE message (including the C-MSISDN, ATU-STI, address of ATCF 930, and address of MSS 920) to ATCF 930. ATCF 930 may subsequently anchor the call in an ATGW and transmit an INVITE message to MSS 920. The INVITE message may include a STI-rSR if received (that may be populated by ATCF 930). The INVITE message may further include a UL IP address and port number for the ATGW, which may be also populated by ATCF 930. Subsequently, MSS 920 may transmit a mobile call terminating setup message to UE 910, where the mobile call terminating setup message may include the STI-rSR. UE 910 may then transmit a call confirm message to MSS 920, where UE 910 may include its port number and codec for a DL media direction within the mobile call originating setup message. MSS 920 may then store the port number and codec for UE 910.

According to an embodiment, an rSRVCC procedure is triggered by a base station system (BSS)/radio access network (RAN), similar to the access transfer procedure described in relation to FIG. 4, where BSC/RNC 410 transmits a handover required message to MSC server 430. When an EPS bearer is reserved and an MSC receives a handover command from a target MME, the BSS/RAN transmits the handover command to a UE for switching the UE to LTE. The MSC can transmit additional information to the UE for a voice media connection, including a UL IP address and port number for an ATGW, where the MSC may receive the additional information during a call setup procedure from an ATCF. This means that the MSC may not be required to transmit an access transfer notification message to the ATCF, in contrast to the access transfer procedure described in relation to FIG. 4. At the same time, the MSC may transmit an access transfer preparation request to the ATCF for voice media switching from a CS to PS leg over LTE. This is similar to MSC server/MGW 520 transmitting an access transfer preparation request to ATCF 540, as previously described in relation to FIG. 5.

After the UE is handed over to LTE, the UE may take over IMS control by sending an access transfer complete message (such as an SIP INVITE message) to the ATCF using the STI-rSR received during either a mobile call originating session setup procedure, as previously described in relation to FIG. 8 (i.e., MSS 820 transmitting a CALL CONF/ALERT message to UE 810, where the CALL CONF/ALERT message may include the STI-rSR if received by ATCF 830), or a mobile call terminating session setup procedure, as previously described in relation to FIG. 9 (i.e., MSS 920 transmitting a mobile call terminating setup message to UE 910, where the mobile call terminating setup message may include the latest received STI-rSR). The ATCF may then indicate to the SCC AS that the UE is now on PS access using the C-MSIISDN and ATU-STI that it may have received from the MSC, as previously described in relation to FIG. 5 (i.e., ATCF 540 reestablishing a communication with SCC AS 560 and updating SCC AS 560 that the transfer has taken place by transmitting an access transfer update message to SCC AS 560). The rest of the rSRVCC procedure may be implemented as previously described in relation to FIG. 5.

Figure 10:
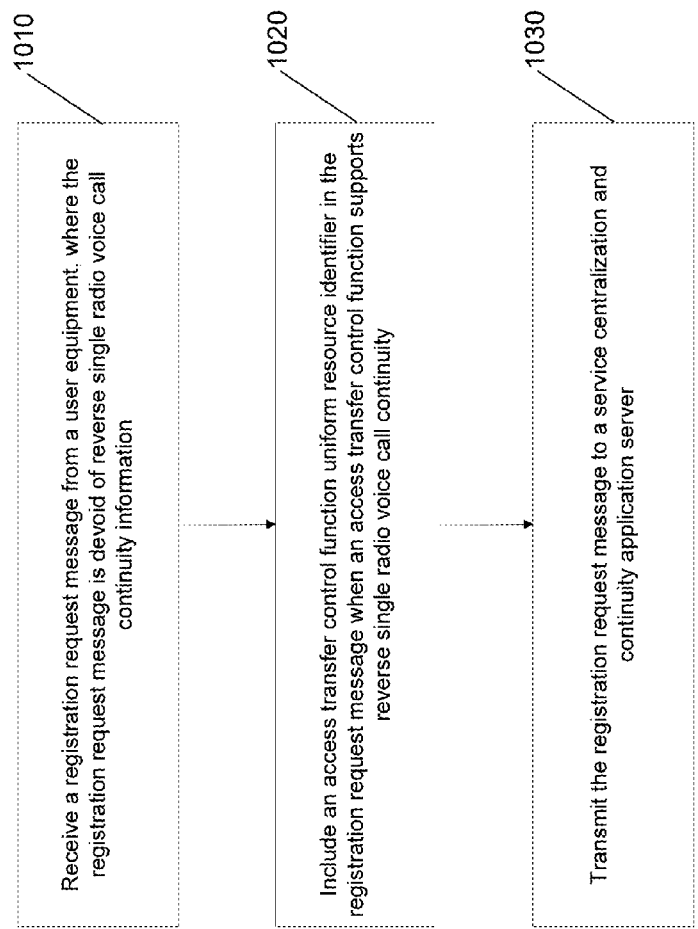
FIG. 10 illustrates a method according to an embodiment of the invention.

FIG. 10 illustrates a method according to an embodiment of the invention. The steps of a method or algorithm described in connection with the embodiments disclosed herein may be embodied directly in hardware, in a computer program executed by a processor, or in a combination of the two. A computer program may be embodied on a computer-readable medium, such as a storage medium. For example, a computer program may reside in RAM, flash memory, ROM, EPROM, EEPROM, registers, hard disk, a removable disk, a CD-ROM, or any other form of storage medium known in the art. An exemplary storage medium may be coupled to the processor such that the processor can read information from, and write information to, the storage medium. In the alternative, the storage medium may be integral to the processor. The processor and the storage medium may reside in an application specific integrated circuit (ASIC). In the alternative, the processor and the storage medium may reside as discrete components. Furthermore, a computer-readable medium may be any type of tangible medium.

At step 1010, a registration request message is received from a user equipment, where the registration request message may be devoid of reverse single radio voice call continuity information. At step 1020, an access transfer control function uniform resource identifier may be included in the registration request message when an access transfer control function supports reverse single radio voice call continuity. Instead of the access transfer control function uniform resource identifier, also some other indication of the support for single radio voice call continuity or identifier of the access transfer control function may be used. At step 1030, the registration request message may be transmitted to a service centralization and continuity application server.

Figure 11:
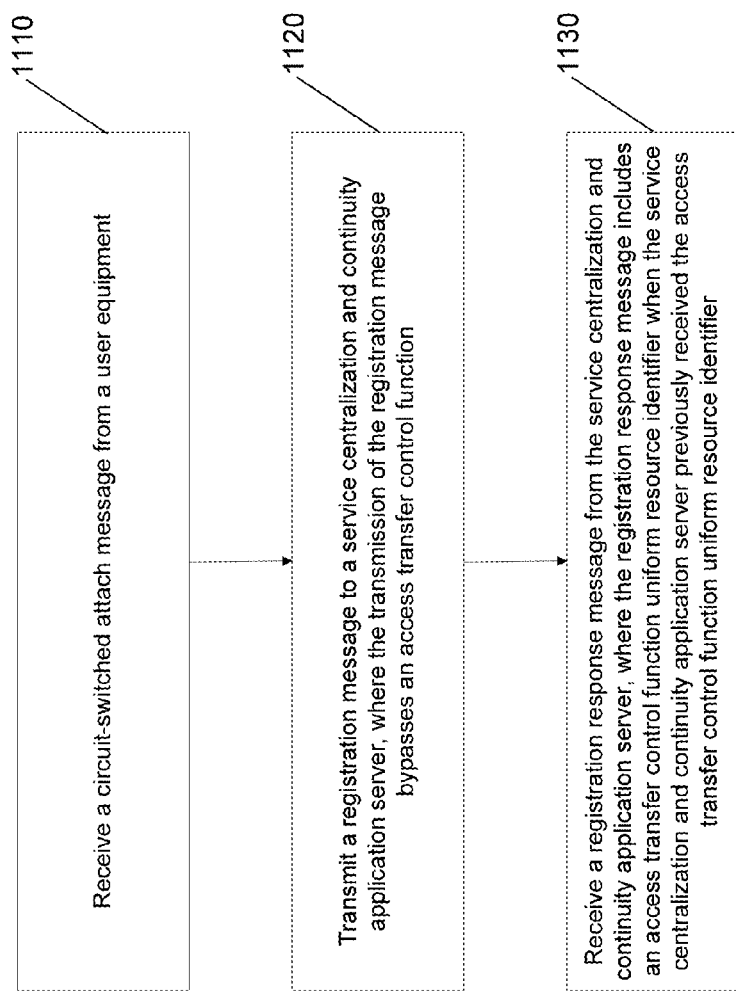
FIG. 11 illustrates a method according to another embodiment of the invention.

FIG. 11 illustrates a method according to another embodiment of the invention. At step 1110, a circuit-switched attach message is received from a user equipment. At step 1120, a registration message is transmitted to a service centralization and continuity application server, where the transmission of the registration message may bypass an access transfer control function. At step 1130, a registration response message may be received from the service centralization and continuity application server. The registration response message may include an access transfer control function uniform resource identifier when the service centralization and continuity application server previously received the access transfer control function uniform resource identifier.

Figure 12:
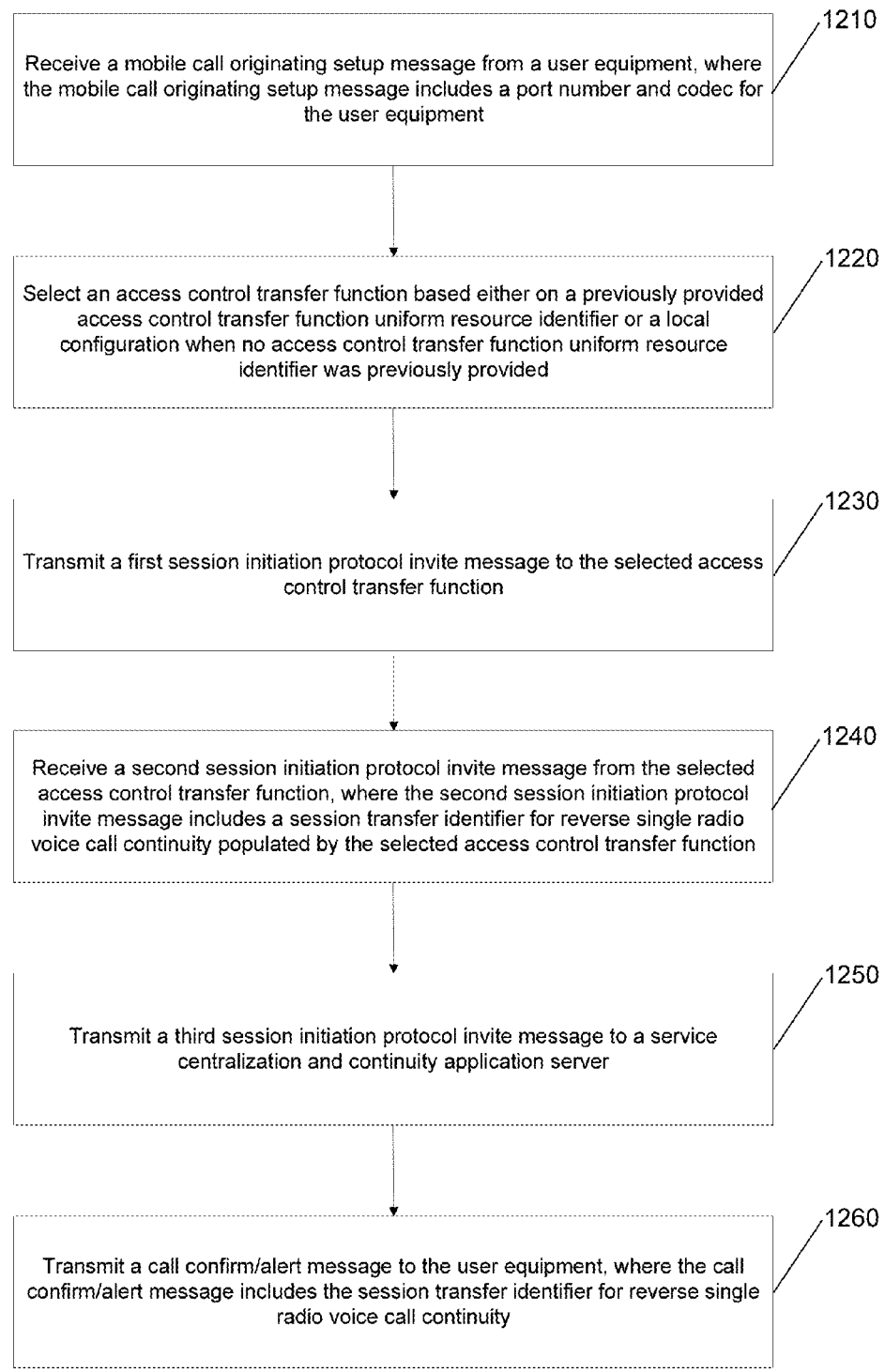
FIG. 12 illustrates a method according to another embodiment of the invention.

FIG. 12 illustrates a method according to another embodiment of the invention. At step 1210, a mobile call originating setup message is received from a user equipment, where the mobile call originating setup message may include a port number and codec for the user equipment. At step 1220, an access control transfer function may be selected. The selection of the access control transfer function may be based either on a previously provided access control transfer function uniform resource identifier, or a local configuration when no access control transfer function uniform resource identifier was previously provided. At step 1230, a first session initiation protocol invite message may be transmitted to the selected access control transfer function. At step 1240, a second session initiation protocol invite message may be received from the selected access control transfer function. The second session initiation protocol invite message may include a session transfer identifier for reverse single radio voice call continuity populated by the selected access control transfer function. At step 1250, a third session initiation protocol invite message may be transmitted to a service centralization and continuity application server. At step 1260, a call confirm/alert message may be transmitted to the user equipment. The call confirm/alert message may include the session transfer identifier for reverse single radio voice call continuity.

Figure 13:
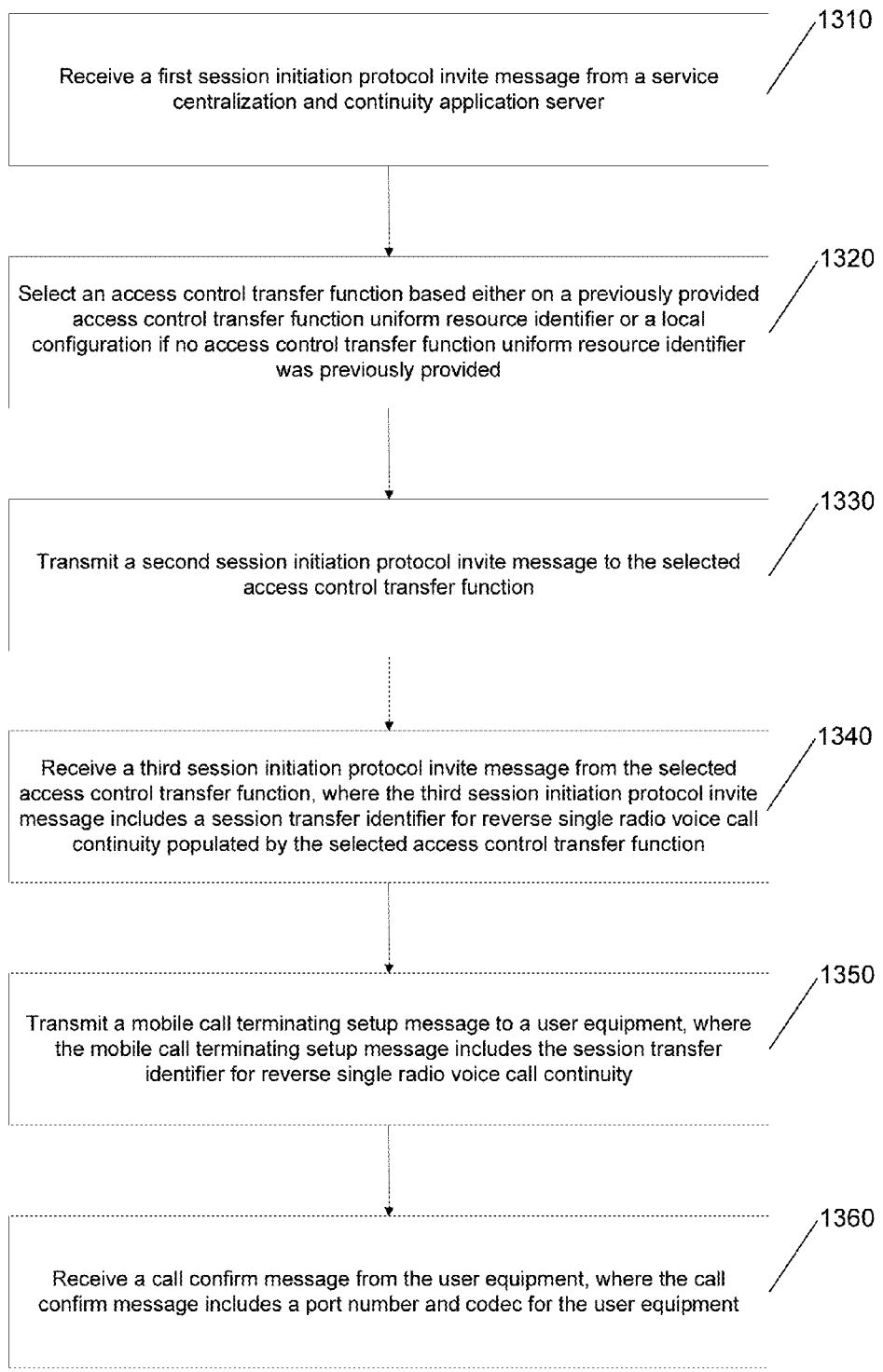
FIG. 13 illustrates a method according to another embodiment of the invention.

FIG. 13 illustrates a method according to another embodiment of the invention. At step 1310, a first session initiation protocol invite message is received from a service centralization and continuity application server. At step 1320, an access control transfer function may be selected. The selection of the access control transfer function may be based either on a previously provided access control transfer function uniform resource identifier, or a local configuration when no access control transfer function uniform resource identifier was previously provided. At step 1330, a second session initiation protocol invite message may be transmitted to the selected access control transfer function. At step 1340, a third session initiation protocol invite message may be received from the selected access control transfer function. The third session initiation protocol invite message may include a session transfer identifier for reverse single radio voice call continuity populated by the selected access control transfer function. At step 1350, a mobile call terminating setup message may be transmitted to a user equipment. The mobile call terminating setup message may include the session transfer identifier for reverse single radio voice call continuity. At 1360, a call confirm message may be received from the user equipment. The call confirm message may include a port number and a codec for the user equipment.

FIG. 14 illustrates an apparatus according to an embodiment of the invention. Apparatus 1400 can include a processor 1410 and a memory 1420. Processor 1410 can read information from, and write information to, memory 1420. Processor 1410 can be a front end processor, a back end processor, a microprocessor, a digital signal processor, a processor with an accompanying digital signal processor, a special-purpose computer chip, a field-programmable gate array (FPGA), a controller, an ASIC, or a computer. Memory 1420 can be RAM, flash memory, ROM, EPROM, EEPROM, registers, hard disk, a removable disk, a CD-ROM, or any other form of storage medium known in the art. Memory 1420 can include computer program code. As one of ordinary skill in the art would readily appreciate, apparatus 1400 can include any number of processors in alternative embodiments. Likewise, apparatus 1400 can include any number of memories in alternative embodiments.

Apparatus 1400 can also include a transceiver 1430, which is configured to transmit and receive a message, and which is connected to processor 1410. Apparatus 1400 can also include antennas 1440 and 1450, where each antenna is configured to assist transceiver 1430 in the transmitting and receiving of a message. While the illustrated embodiment in FIG. 14 depicts two antennas, one of ordinary skill in the art would readily appreciate that apparatus 1400 can include any number of antennas in alternative embodiments. In an alternative embodiment, apparatus 1400 can include a single antenna.

In one embodiment, memory 1420 and the computer program code can, with processor 1410, cause apparatus 1400 to implement the method described in relation to FIG. 10. In an alternate embodiment, memory 1420 and the computer program code can, with processor 1410, cause apparatus 1400 to implement the method described in relation to FIG. 11. In an alternate embodiment, memory 1420 and the computer program code can, with processor 1410, cause apparatus 1400 to implement the method described in relation to FIG. 12. In an alternate embodiment, memory 1420 and the computer program code can, with processor 1410, cause apparatus 1400 to implement the method described in relation to FIG. 13.

According to certain embodiments of the invention, an ATCF can be implemented without a database implementation that stores UE data. The ATCF can also be dynamically allocated by a MSS or it can be assigned as eSRVCC. There is no need to have an I2 registration by the MSS when the ATCF is changed on the PS side due to any reasons. Furthermore, the IMS and MSS resources are not tied together in such a way that a change of an MSS- or IMS-related network element during registration or location updating does not require that the change be reflected in the other domain.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
receiving a registration request message at an access transfer control function from a user equipment;
including at the access transfer control function an access transfer control function uniform resource identifier in the registration request message when the access transfer control function supports reverse single radio voice call continuity, wherein the access transfer control function uniform resource identifier points to the access transfer control function used in both reverse single radio voice call continuity and enhanced single radio voice call continuity; and
transmitting the registration request message from the access transfer control function to a serving call session control function and then to a service centralization and continuity application server,
wherein the registration request message is devoid of reverse single radio voice call continuity information.

2. The method of claim 1, wherein the registration request message comprises a session initiation protocol register message.

3. The method of claim 1, further comprising:
allocating a session transfer number for single radio voice call continuity; and
including the session transfer number for single radio voice call continuity in the registration request message.

4. The method of claim 1, further comprising transmitting an acknowledgement message to the user equipment.

5. An apparatus, comprising:
a processor;
a memory including computer program code,
wherein the memory and the computer program code are configured to, with the processor, cause the apparatus at least to,
receive a registration request message at an access transfer control function from a user equipment,
include at the access transfer control function an access transfer control function uniform resource identifier in the registration request message when the access transfer control function supports reverse single radio voice call continuity, wherein the access transfer control function uniform resource identifier points to the access transfer control function used in both reverse single radio voice call continuity and enhanced single radio voice call continuity, and
transmit the registration request message from the access transfer control function to a serving call session control function and then to a service centralization and continuity application server,
wherein the registration request message is devoid of reverse single radio voice call continuity information.

6. The apparatus of claim 5, wherein the registration request message comprises a session initiation protocol register message.

7. The apparatus of claim 5, wherein the memory and computer program code are configured to, with the processor, cause the apparatus at least to,
allocate a session transfer number for single radio voice call continuity, and
include the session transfer number for single radio voice call continuity in the registration request message.

8. The apparatus of claim 5, wherein the memory and the computer program code are configured to, with the processor, cause the apparatus at least to transmit an acknowledgement message to the user equipment.

9. A non-transitory computer-readable medium, comprising a computer program embodied therein, configured to control a processor to implement a method, the method comprising:
receiving a registration request message at an access transfer control function from a user equipment;
including at the access transfer control function an access transfer control function uniform resource identifier in the registration request message when the access transfer control function supports reverse single radio voice call continuity, wherein the access transfer control function uniform resource identifier points to the access transfer control function used in both reverse single radio voice call continuity and enhanced single radio voice call continuity; and
transmitting the registration request message from the access transfer control function to a serving call session control function and then to a service centralization and continuity application server,
wherein the registration request message is devoid of reverse single radio voice call continuity information.

10. A method, comprising:
receiving a circuit-switched attach message from a user equipment;
transmitting a registration message to a serving call session control function and then to a service centralization and continuity application server, wherein the transmission of the registration message bypasses an access transfer control function; and
receiving a registration response message from the service centralization and continuity application server;
wherein the registration response message comprises an access transfer control function uniform resource identifier when the service centralization and continuity application server previously received the transfer control function uniform resource identifier, the access transfer control function uniform resource identifier being included at the access transfer control function when receiving a registration request message devoid of reverse single radio voice call continuity information, and
wherein the access transfer control function uniform resource identifier points to the access transfer control function used in both reverse single radio voice call continuity and enhanced single radio voice call continuity.

11. The method of claim 10, wherein the registration response message further comprises a correlation mobile subscriber integrated services digital network number and an access-transfer update-session transfer identifier.

12. The method of claim 10, further comprising:
deriving a domain name from an identity of the user equipment; and
discovering an address of the service centralization and continuity application server.

13. The method of claim 10, wherein the registration message is an internet protocol multimedia subsystem registration message.

14. An apparatus, comprising:
a processor;
a memory including computer program code,
wherein the memory and the computer program code are configured to, with the processor, cause the apparatus at least to,
receive a circuit-switched attach message from a user equipment, transmit a registration message to a serving call session control function and then to a service centralization and continuity application server, wherein the transmission of the registration message bypasses an access transfer control function, and receive a registration response message from the service centralization and continuity application server;

wherein the registration response message comprises an access transfer control function uniform resource identifier when the service centralization and continuity application server previously received the access transfer control function uniform resource identifier, the access transfer control function uniform resource identifier being included at the access transfer control function when receiving a registration request message devoid of reverse single radio voice call continuity information, and wherein the access transfer control function uniform resource identifier points to the access transfer control function used in both reverse single radio voice call continuity and enhanced single radio voice call continuity.

15. The apparatus of claim 14, wherein the registration response message further comprises a correlation mobile subscriber integrated services digital network number and an access-transfer update—session transfer identifier.

16. The apparatus of claim 14, wherein the memory and the computer program code are configured to, with the processor, cause the apparatus at least to, derive a domain name from an identity of the user equipment; and discover an address of the service centralization and continuity application server.

17. The apparatus of claim 14, wherein the registration message is an internet protocol multimedia subsystem registration message.

18. A non-transitory computer-readable medium, comprising a computer program embodied therein, configured to control a processor to implement a method, the method comprising:

receiving a circuit-switched attach message from a user equipment;

transmitting a registration message to a serving call session control function and then to a service centralization and continuity application server, wherein the transmission of the registration message bypasses an access transfer control function; and receiving a registration response message from the service centralization and continuity application server;

wherein the registration response message comprises an access transfer control function uniform resource identifier when the service centralization and continuity application server previously received the access transfer control function uniform resource identifier, the access transfer control function uniform resource identifier being included at the access transfer control function when receiving a registration request message devoid of reverse single radio voice call continuity information, and wherein the access transfer control function uniform resource identifier points to the access transfer control function used in both reverse single radio voice call continuity and enhanced single radio voice call continuity.

* * * * *